United States Patent
Hosseini et al.

(10) Patent No.: US 10,680,319 B2
(45) Date of Patent: Jun. 9, 2020

(54) DEVICES AND METHODS FOR REDUCING MUTUAL COUPLING EFFECTS IN WIRELESS POWER TRANSMISSION SYSTEMS

(71) Applicant: Energous Corporation, San Jose, CA (US)

(72) Inventors: Alister Hosseini, Long Beach, CA (US); Michael A. Leabman, Pleasanton, CA (US)

(73) Assignee: Energous Corporation, San Jose, CA (US)

( * ) Notice: Subject to any disclaimer, the term of this patent is extended or adjusted under 35 U.S.C. 154(b) by 606 days.

(21) Appl. No.: 15/400,815

(22) Filed: Jan. 6, 2017

(65) Prior Publication Data

US 2018/0198199 A1   Jul. 12, 2018

(51) Int. Cl.
*H01Q 1/52* (2006.01)
*H01Q 9/04* (2006.01)
(Continued)

(52) U.S. Cl.
CPC ........... *H01Q 1/521* (2013.01); *H01Q 9/0407* (2013.01); *H01Q 15/008* (2013.01); *H02J 7/025* (2013.01);
(Continued)

(58) Field of Classification Search
CPC .... H01Q 1/521; H01Q 15/008; H01Q 9/0407; H01Q 3/26; H01Q 9/0485; H02J 50/23;
(Continued)

(56) References Cited

U.S. PATENT DOCUMENTS 787,412 A    4/1905  Tesla
2,811,624 A  10/1957 Haagensen
(Continued)

FOREIGN PATENT DOCUMENTS

CN   102292896 A   12/2011
CN   102860037 A    1/2013
(Continued)

OTHER PUBLICATIONS

Energous Corp., ISRWO, PCT/US2014/037170, Sep. 15, 2014, 11 pgs.
(Continued)

*Primary Examiner* — Pinping Sun
(74) *Attorney, Agent, or Firm* — Morgan, Lewis & Bockius LLP

(57) ABSTRACT

The various embodiments described herein include methods, devices, and systems for reducing mutual coupling between antennas. In one aspect, a wireless charging system includes: (1) two antennas configured to direct electromagnetic waves toward a wireless power receiver such that the electromagnetic waves interfere constructively at the receiver; and (2) a housing structure configured to receive the antennas, including: (a) a metallic base, (b) a first set of isolating components extending upwardly and defining a first region configured to receive a first antenna, and (c) a second set of isolating components extending upwardly and defining a second region configured to receive a second antenna, the second set including at least some isolating components distinct from those in the first set. The first and second sets of isolating components configured to: (i) create a physical gap between the antennas, and (ii) reduce a mutual coupling between the antennas.

19 Claims, 8 Drawing Sheets

(51) Int. Cl.
*H02J 7/02* (2016.01)
*H02J 50/40* (2016.01)
*H02J 50/80* (2016.01)
*H02J 50/90* (2016.01)
*H01Q 15/00* (2006.01)
*H02J 50/23* (2016.01)
*H04B 5/00* (2006.01)
*H01Q 3/26* (2006.01)

(52) U.S. Cl.
CPC .............. *H02J 50/23* (2016.02); *H02J 50/40* (2016.02); *H02J 50/80* (2016.02); *H02J 50/90* (2016.02); *H01Q 3/26* (2013.01); *H01Q 9/0485* (2013.01); *H04B 5/0037* (2013.01)

(58) Field of Classification Search
CPC .. H02J 50/90; H02J 50/80; H02J 50/40; H02J 7/025; H04B 5/0037
See application file for complete search history.

(56) References Cited

U.S. PATENT DOCUMENTS

| | | |
|---|---|---|
| 2,863,148 A | 12/1958 | Gammon et al. |
| 3,167,775 A | 1/1965 | Guertler |
| 3,434,678 A | 3/1969 | Brown et al. |
| 3,696,384 A | 10/1972 | Lester |
| 3,754,269 A | 8/1973 | Clavin |
| 4,101,895 A | 7/1978 | Jones, Jr. |
| 4,360,741 A | 11/1982 | Fitzsimmons et al. |
| 4,944,036 A | 7/1990 | Hyatt |
| 4,995,010 A | 2/1991 | Knight |
| 5,200,759 A | 4/1993 | McGinnis |
| 5,211,471 A | 5/1993 | Rohrs |
| 5,276,455 A * | 1/1994 | Fitzsimmons ..... H01Q 21/0087 342/368 |
| 5,548,292 A | 8/1996 | Hirshfield et al. |
| 5,556,749 A | 9/1996 | Mitsuhashi et al. |
| 5,568,088 A | 10/1996 | Dent et al. |
| 5,646,633 A | 7/1997 | Dahlberg |
| 5,697,063 A | 12/1997 | Kishigami et al. |
| 5,712,642 A | 1/1998 | Hulderman |
| 5,936,527 A | 8/1999 | Isaacman et al. |
| 5,982,139 A | 11/1999 | Parise |
| 6,046,708 A | 4/2000 | MacDonald, Jr. et al. |
| 6,127,799 A | 10/2000 | Krishnan |
| 6,127,942 A | 10/2000 | Welle |
| 6,163,296 A | 12/2000 | Lier et al. |
| 6,271,799 B1 | 8/2001 | Rief |
| 6,289,237 B1 | 9/2001 | Mickle et al. |
| 6,329,908 B1 | 12/2001 | Frecska |
| 6,400,586 B2 | 6/2002 | Raddi et al. |
| 6,421,235 B2 | 7/2002 | Ditzik |
| 6,437,685 B2 | 8/2002 | Hanaki |
| 6,456,253 B1 | 9/2002 | Rummeli et al. |
| 6,476,795 B1 | 11/2002 | Derocher et al. |
| 6,501,414 B2 | 12/2002 | Amdt et al. |
| 6,583,723 B2 | 6/2003 | Watanabe et al. |
| 6,597,897 B2 | 7/2003 | Tang |
| 6,615,074 B2 | 9/2003 | Mickle et al. |
| 6,650,376 B1 | 11/2003 | Obitsu |
| 6,664,920 B1 | 12/2003 | Mott et al. |
| 6,680,700 B2 | 1/2004 | Hilgers |
| 6,798,716 B1 | 9/2004 | Charych |
| 6,803,744 B1 | 10/2004 | Sabo |
| 6,853,197 B1 | 2/2005 | McFarland |
| 6,856,291 B2 | 2/2005 | Mickle et al. |
| 6,911,945 B2 | 6/2005 | Korva |
| 6,960,968 B2 | 11/2005 | Odendaal et al. |
| 6,967,462 B1 | 11/2005 | Landis |
| 6,988,026 B2 | 1/2006 | Breed et al. |
| 7,003,350 B2 | 2/2006 | Denker et al. |
| 7,027,311 B2 | 4/2006 | Vanderelli et al. |
| 7,068,234 B2 | 6/2006 | Sievenpiper |
| 7,068,991 B2 | 6/2006 | Parise |
| 7,079,079 B2 | 7/2006 | Jo et al. |
| 7,183,748 B1 | 2/2007 | Unno et al. |
| 7,191,013 B1 | 3/2007 | Miranda et al. |
| 7,193,644 B2 | 3/2007 | Carter |
| 7,196,663 B2 | 3/2007 | Bolzer et al. |
| 7,205,749 B2 | 4/2007 | Hagen et al. |
| 7,215,296 B2 | 5/2007 | Abramov et al. |
| 7,222,356 B1 | 5/2007 | Yonezawa et al. |
| 7,274,334 B2 | 9/2007 | o'Riordan et al. |
| 7,274,336 B2 | 9/2007 | Carson |
| 7,351,975 B2 | 4/2008 | Brady et al. |
| 7,359,730 B2 | 4/2008 | Dennis et al. |
| 7,372,408 B2 | 5/2008 | Gaucher |
| 7,392,068 B2 | 6/2008 | Dayan |
| 7,403,803 B2 | 7/2008 | Mickle et al. |
| 7,443,057 B2 | 10/2008 | Nunally |
| 7,451,839 B2 | 11/2008 | Perlman |
| 7,463,201 B2 | 12/2008 | Chiang et al. |
| 7,471,247 B2 | 12/2008 | Saily |
| 7,535,195 B1 | 5/2009 | Horovitz et al. |
| 7,614,556 B2 | 11/2009 | Overhultz et al. |
| 7,639,994 B2 | 12/2009 | Greene et al. |
| 7,643,312 B2 | 1/2010 | Vanderelli et al. |
| 7,652,577 B1 | 1/2010 | Madhow et al. |
| 7,679,576 B2 | 3/2010 | Riedel et al. |
| 7,702,771 B2 | 4/2010 | Ewing et al. |
| 7,786,419 B2 | 8/2010 | Hyde et al. |
| 7,812,771 B2 | 10/2010 | Greene et al. |
| 7,830,312 B2 | 11/2010 | Choudhury et al. |
| 7,844,306 B2 | 11/2010 | Shearer et al. |
| 7,868,482 B2 | 1/2011 | Greene et al. |
| 7,898,105 B2 | 3/2011 | Greene et al. |
| 7,904,117 B2 | 3/2011 | Doan et al. |
| 7,911,386 B1 | 3/2011 | Ito et al. |
| 7,925,308 B2 | 4/2011 | Greene et al. |
| 7,948,208 B2 | 5/2011 | Partovi et al. |
| 8,049,676 B2 | 11/2011 | Yoon et al. |
| 8,055,003 B2 | 11/2011 | Mittleman et al. |
| 8,070,595 B2 | 12/2011 | Alderucci et al. |
| 8,072,380 B2 | 12/2011 | Crouch |
| 8,092,301 B2 | 1/2012 | Alderucci et al. |
| 8,099,140 B2 | 1/2012 | Arai |
| 8,115,448 B2 | 2/2012 | John |
| 8,159,090 B2 | 4/2012 | Greene et al. |
| 8,159,364 B2 | 4/2012 | Zeine |
| 8,180,286 B2 | 5/2012 | Yamasuge |
| 8,184,454 B2 * | 5/2012 | Mao ...................... H02J 50/70 361/818 |
| 8,228,194 B2 | 7/2012 | Mickle |
| 8,234,509 B2 | 7/2012 | Gioscia et al. |
| 8,264,101 B2 | 9/2012 | Hyde et al. |
| 8,264,291 B2 | 9/2012 | Morita |
| 8,276,325 B2 | 10/2012 | Clifton et al. |
| 8,278,784 B2 | 10/2012 | Cook et al. |
| 8,284,101 B2 | 10/2012 | Fusco |
| 8,310,201 B1 | 11/2012 | Wright |
| 8,338,991 B2 | 12/2012 | Von Novak et al. |
| 8,362,745 B2 | 1/2013 | Tinaphong |
| 8,380,255 B2 | 2/2013 | Shearer et al. |
| 8,384,600 B2 | 2/2013 | Huang et al. |
| 8,410,953 B2 | 4/2013 | Zeine |
| 8,411,963 B2 | 4/2013 | Luff |
| 8,432,062 B2 | 4/2013 | Greene et al. |
| 8,432,071 B2 | 4/2013 | Huang et al. |
| 8,446,248 B2 | 5/2013 | Zeine |
| 8,447,234 B2 | 5/2013 | Cook et al. |
| 8,451,189 B1 | 5/2013 | Fluhler |
| 8,452,235 B2 | 5/2013 | Kirby et al. |
| 8,457,656 B2 | 6/2013 | Perkins et al. |
| 8,461,817 B2 | 6/2013 | Martin et al. |
| 8,467,733 B2 | 6/2013 | Leabman |
| 8,497,601 B2 | 7/2013 | Hall et al. |
| 8,497,658 B2 | 7/2013 | Von Novak et al. |
| 8,552,597 B2 | 8/2013 | Song et al. |
| 8,558,661 B2 | 10/2013 | Zeine |
| 8,560,026 B2 | 10/2013 | Chanterac |
| 8,604,746 B2 | 12/2013 | Lee |
| 8,614,643 B2 | 12/2013 | Leabman |
| 8,621,245 B2 | 12/2013 | Shearer et al. |

(56) References Cited

U.S. PATENT DOCUMENTS

| | | |
|---|---|---|
| 8,626,249 B2 | 1/2014 | Kuusilinna et al. |
| 8,629,576 B2 | 1/2014 | Levine |
| 8,653,966 B2 | 2/2014 | Rao et al. |
| 8,674,551 B2 | 3/2014 | Low et al. |
| 8,686,685 B2 | 4/2014 | Moshfeghi |
| 8,686,905 B2 | 4/2014 | Shtrom |
| 8,712,355 B2 | 4/2014 | Black et al. |
| 8,712,485 B2 | 4/2014 | Tam |
| 8,718,773 B2 | 5/2014 | Wills et al. |
| 8,729,737 B2 | 5/2014 | Schatz et al. |
| 8,736,228 B1 | 5/2014 | Freed et al. |
| 8,760,113 B2 | 6/2014 | Keating |
| 8,770,482 B2 | 7/2014 | Ackermann et al. |
| 8,772,960 B2 | 7/2014 | Yoshida |
| 8,823,319 B2 | 9/2014 | Von Novak, III et al. |
| 8,832,646 B1 | 9/2014 | Wendling |
| 8,854,176 B2 | 10/2014 | Zeine |
| 8,860,364 B2 | 10/2014 | Low et al. |
| 8,897,770 B1 | 11/2014 | Frolov et al. |
| 8,903,456 B2 | 12/2014 | Chu et al. |
| 8,917,057 B2 | 12/2014 | Hui |
| 8,923,189 B2 | 12/2014 | Leabman |
| 8,928,544 B2 | 1/2015 | Massie et al. |
| 8,937,408 B2 | 1/2015 | Ganem et al. |
| 8,946,940 B2 | 2/2015 | Kim et al. |
| 8,963,486 B2 | 2/2015 | Kirby et al. |
| 8,970,070 B2 | 3/2015 | Sada et al. |
| 8,989,053 B1 | 3/2015 | Skaaksrud et al. |
| 9,000,616 B2 | 4/2015 | Greene et al. |
| 9,001,622 B2 | 4/2015 | Perry |
| 9,006,934 B2 | 4/2015 | Kozakai et al. |
| 9,021,277 B2 | 4/2015 | Shearer et al. |
| 9,030,161 B2 | 5/2015 | Lu et al. |
| 9,059,598 B2 | 6/2015 | Kang et al. |
| 9,059,599 B2 | 6/2015 | Won et al. |
| 9,077,188 B2 | 7/2015 | Moshfeghi |
| 9,083,595 B2 | 7/2015 | Rakib et al. |
| 9,088,216 B2 | 7/2015 | Garrity et al. |
| 9,124,125 B2 | 9/2015 | Leabman et al. |
| 9,130,397 B2 | 9/2015 | Leabman et al. |
| 9,130,602 B2 | 9/2015 | Cook |
| 9,142,998 B2 | 9/2015 | Yu et al. |
| 9,143,000 B2 | 9/2015 | Leabman et al. |
| 9,143,010 B2 | 9/2015 | Urano |
| 9,153,074 B2 | 10/2015 | Zhou et al. |
| 9,178,389 B2 | 11/2015 | Hwang |
| 9,225,196 B2 | 12/2015 | Huang et al. |
| 9,240,469 B2 | 1/2016 | Sun et al. |
| 9,242,411 B2 | 1/2016 | Kritchman et al. |
| 9,244,500 B2 | 1/2016 | Cain et al. |
| 9,252,628 B2 | 2/2016 | Leabman et al. |
| 9,270,344 B2 | 2/2016 | Rosenberg |
| 9,276,329 B2 | 3/2016 | Jones et al. |
| 9,282,582 B1 | 3/2016 | Dunsbergen et al. |
| 9,294,840 B1 | 3/2016 | Anderson et al. |
| 9,297,896 B1 | 3/2016 | Andrews |
| 9,318,898 B2 | 4/2016 | John |
| 9,368,020 B1 | 6/2016 | Bell et al. |
| 9,401,977 B1 | 7/2016 | Gaw |
| 9,409,490 B2 | 8/2016 | Kawashima |
| 9,419,335 B2 | 8/2016 | Pintos |
| 9,438,045 B1 | 9/2016 | Leabman |
| 9,438,046 B1 | 9/2016 | Leabman |
| 9,444,283 B2 | 9/2016 | Son et al. |
| 9,450,449 B1 | 9/2016 | Leabman et al. |
| 9,461,502 B2 | 10/2016 | Lee et al. |
| 9,520,725 B2 | 12/2016 | Masaoka et al. |
| 9,520,748 B2 | 12/2016 | Hyde et al. |
| 9,522,270 B2 | 12/2016 | Perryman et al. |
| 9,532,748 B2 * | 1/2017 | Denison ............ A61B 5/04012 |
| 9,537,354 B2 | 1/2017 | Bell et al. |
| 9,537,357 B2 | 1/2017 | Leabman |
| 9,537,358 B2 | 1/2017 | Leabman |
| 9,538,382 B2 | 1/2017 | Bell et al. |
| 9,544,640 B2 | 1/2017 | Lau |
| 9,559,553 B2 | 1/2017 | Bae |
| 9,564,773 B2 | 2/2017 | Pogorelik et al. |
| 9,571,974 B2 | 2/2017 | Choi et al. |
| 9,590,317 B2 | 3/2017 | Zimmerman et al. |
| 9,590,444 B2 | 3/2017 | Walley |
| 9,620,996 B2 | 4/2017 | Zeine |
| 9,647,328 B2 | 5/2017 | Dobric |
| 9,706,137 B2 | 7/2017 | Scanlon et al. |
| 9,711,999 B2 | 7/2017 | Hietala et al. |
| 9,723,635 B2 | 8/2017 | Nambord et al. |
| 9,793,758 B2 | 10/2017 | Leabman |
| 9,793,764 B2 | 10/2017 | Perry |
| 9,800,172 B1 | 10/2017 | Leabman |
| 9,806,564 B2 | 10/2017 | Leabman |
| 9,819,230 B2 | 11/2017 | Petras et al. |
| 9,825,674 B1 | 11/2017 | Leabman |
| 9,843,229 B2 | 12/2017 | Leabman |
| 9,847,669 B2 | 12/2017 | Leabman |
| 9,847,677 B1 | 12/2017 | Leabman |
| 9,853,361 B2 | 12/2017 | Chen et al. |
| 9,853,692 B1 | 12/2017 | Bell et al. |
| 9,859,758 B1 | 1/2018 | Leabman |
| 9,866,279 B2 | 1/2018 | Bell et al. |
| 9,867,032 B2 | 1/2018 | Verma et al. |
| 9,871,301 B2 | 1/2018 | Contopanagos |
| 9,876,380 B1 | 1/2018 | Leabman et al. |
| 9,876,394 B1 | 1/2018 | Leabman |
| 9,876,536 B1 | 1/2018 | Bell et al. |
| 9,882,394 B1 | 1/2018 | Bell et al. |
| 9,887,584 B1 | 2/2018 | Bell et al. |
| 9,893,555 B1 | 2/2018 | Leabman et al. |
| 9,893,564 B2 | 2/2018 | de Rochemont |
| 9,899,844 B1 | 2/2018 | Bell et al. |
| 9,899,861 B1 | 2/2018 | Leabman et al. |
| 9,917,477 B1 | 3/2018 | Bell et al. |
| 9,923,386 B1 | 3/2018 | Leabman et al. |
| 9,939,864 B1 | 4/2018 | Bell et al. |
| 9,965,009 B1 | 5/2018 | Bell et al. |
| 9,966,765 B1 | 5/2018 | Leabman |
| 9,966,784 B2 | 5/2018 | Leabman |
| 9,967,743 B1 | 5/2018 | Bell et al. |
| 9,973,008 B1 | 5/2018 | Leabman |
| 10,003,211 B1 | 6/2018 | Leabman et al. |
| 10,014,728 B1 | 7/2018 | Leabman |
| 10,027,159 B2 | 7/2018 | Hosseini |
| 10,038,337 B1 | 7/2018 | Leabman et al. |
| 10,050,462 B1 | 8/2018 | Leabman et al. |
| 10,056,782 B1 | 8/2018 | Leabman |
| 10,063,064 B1 | 8/2018 | Bell et al. |
| 10,068,703 B1 | 9/2018 | Contopanagos |
| 10,075,008 B1 | 9/2018 | Bell et al. |
| 10,090,699 B1 | 10/2018 | Leabman |
| 10,090,886 B1 | 10/2018 | Bell et al. |
| 10,103,552 B1 | 10/2018 | Leabman et al. |
| 10,122,219 B1 | 11/2018 | Hosseini et al. |
| 10,124,754 B1 | 11/2018 | Leabman |
| 10,128,686 B1 | 11/2018 | Leabman et al. |
| 10,134,260 B1 | 11/2018 | Bell et al. |
| 10,135,112 B1 | 11/2018 | Hosseini |
| 10,135,294 B1 | 11/2018 | Leabman |
| 10,141,771 B1 | 11/2018 | Hosseini et al. |
| 10,148,097 B1 | 12/2018 | Leabman et al. |
| 10,153,645 B1 | 12/2018 | Bell et al. |
| 10,153,653 B1 | 12/2018 | Bell et al. |
| 10,153,660 B1 | 12/2018 | Leabman et al. |
| 10,158,257 B2 | 12/2018 | Leabman |
| 10,158,259 B1 | 12/2018 | Leabman |
| 10,164,478 B2 | 12/2018 | Leabman |
| 10,170,917 B1 | 1/2019 | Bell et al. |
| 10,181,756 B2 | 1/2019 | Bae et al. |
| 10,186,892 B2 | 1/2019 | Hosseini et al. |
| 10,193,396 B1 | 1/2019 | Bell et al. |
| 10,199,835 B2 | 2/2019 | Bell |
| 10,199,849 B1 | 2/2019 | Bell |
| 10,205,239 B1 | 2/2019 | Contopanagos et al. |
| 10,211,674 B1 | 2/2019 | Leabman et al. |
| 10,223,717 B1 | 3/2019 | Bell |
| 10,224,758 B2 | 3/2019 | Leabman et al. |
| 10,224,982 B1 | 3/2019 | Leabman |

(56) References Cited

U.S. PATENT DOCUMENTS

| | | |
|---|---|---|
| 10,230,266 B1 | 3/2019 | Leabman et al. |
| 10,243,414 B1 | 3/2019 | Leabman et al. |
| 10,256,657 B2 | 4/2019 | Hosseini et al. |
| 10,256,677 B2 | 4/2019 | Hosseini et al. |
| 10,263,432 B1 | 4/2019 | Leabman et al. |
| 10,291,055 B1 | 5/2019 | Bell et al. |
| 10,291,066 B1 | 5/2019 | Leabman |
| 10,291,294 B2 | 5/2019 | Leabman |
| 10,298,024 B2 | 5/2019 | Leabman |
| 10,298,133 B2 | 5/2019 | Leabman |
| 10,305,315 B2 | 5/2019 | Leabman et al. |
| 10,312,715 B2 | 6/2019 | Leabman |
| 10,333,332 B1 | 6/2019 | Hosseini |
| 10,396,588 B2 | 8/2019 | Leabman |
| 2001/0027876 A1 | 10/2001 | Tsukamoto et al. |
| 2002/0001307 A1 | 1/2002 | Nguyen et al. |
| 2002/0024471 A1 | 2/2002 | Ishitobi |
| 2002/0028655 A1 | 3/2002 | Rosener et al. |
| 2002/0034958 A1 | 3/2002 | Oberschmidt et al. |
| 2002/0054330 A1 | 5/2002 | Jinbo et al. |
| 2002/0065052 A1 | 5/2002 | Pande et al. |
| 2002/0072784 A1 | 6/2002 | Sheppard et al. |
| 2002/0095980 A1 | 7/2002 | Breed et al. |
| 2002/0103447 A1 | 8/2002 | Terry |
| 2002/0123776 A1 | 9/2002 | Von Arx |
| 2002/0133592 A1 | 9/2002 | Matsuda |
| 2002/0171594 A1 | 11/2002 | Fang |
| 2002/0172223 A1 | 11/2002 | Stilp |
| 2003/0005759 A1 | 1/2003 | Breed et al. |
| 2003/0038750 A1 | 2/2003 | Chen |
| 2003/0058187 A1 | 3/2003 | Billiet et al. |
| 2003/0076274 A1 | 4/2003 | Phelan et al. |
| 2003/0179152 A1 | 9/2003 | Watada et al. |
| 2003/0179573 A1 | 9/2003 | Chun |
| 2003/0192053 A1 | 10/2003 | Sheppard et al. |
| 2004/0019624 A1 | 1/2004 | Sukegawa |
| 2004/0020100 A1 | 2/2004 | O'Brian et al. |
| 2004/0036657 A1 | 2/2004 | Forster et al. |
| 2004/0066251 A1 | 4/2004 | Eleftheriades et al. |
| 2004/0107641 A1 | 6/2004 | Walton et al. |
| 2004/0113543 A1 | 6/2004 | Daniels |
| 2004/0119675 A1 | 6/2004 | Washio et al. |
| 2004/0130425 A1 | 7/2004 | Dayan et al. |
| 2004/0130442 A1 | 7/2004 | Breed |
| 2004/0142733 A1 | 7/2004 | Parise |
| 2004/0145342 A1 | 7/2004 | Lyon |
| 2004/0155832 A1 | 8/2004 | Yuanzhu |
| 2004/0196190 A1 | 10/2004 | Mendolia et al. |
| 2004/0203979 A1 | 10/2004 | Attar et al. |
| 2004/0207559 A1 | 10/2004 | Milosavljevic |
| 2004/0218759 A1 | 11/2004 | Yacobi |
| 2004/0241402 A1* | 12/2004 | Kawate ............... H05K 3/4046 428/209 |
| 2004/0259604 A1 | 12/2004 | Mickle et al. |
| 2004/0263124 A1 | 12/2004 | Wieck et al. |
| 2005/0007276 A1 | 1/2005 | Barrick et al. |
| 2005/0030118 A1 | 2/2005 | Wang |
| 2005/0046584 A1 | 3/2005 | Breed |
| 2005/0055316 A1 | 3/2005 | Williams |
| 2005/0077872 A1 | 4/2005 | Single |
| 2005/0093766 A1 | 5/2005 | Turner |
| 2005/0116683 A1 | 6/2005 | Cheng |
| 2005/0117660 A1 | 6/2005 | Vialle et al. |
| 2005/0134517 A1 | 6/2005 | Gottl |
| 2005/0171411 A1 | 8/2005 | KenKnight |
| 2005/0198673 A1 | 9/2005 | Kit et al. |
| 2005/0227619 A1 | 10/2005 | Lee et al. |
| 2005/0232469 A1 | 10/2005 | Schofield |
| 2005/0237249 A1 | 10/2005 | Nagel |
| 2005/0237258 A1 | 10/2005 | Abramov et al. |
| 2005/0282591 A1 | 12/2005 | Shaff |
| 2006/0013335 A1 | 1/2006 | Leabman |
| 2006/0019712 A1 | 1/2006 | Choi |
| 2006/0030279 A1 | 2/2006 | Leabman et al. |
| 2006/0033674 A1 | 2/2006 | Essig, Jr. et al. |
| 2006/0071308 A1 | 4/2006 | Tang et al. |
| 2006/0092079 A1 | 5/2006 | de Rochemont |
| 2006/0094425 A1 | 5/2006 | Mickle et al. |
| 2006/0113955 A1 | 6/2006 | Nunally |
| 2006/0119532 A1 | 6/2006 | Yun et al. |
| 2006/0136004 A1 | 6/2006 | Cowan et al. |
| 2006/0160517 A1 | 7/2006 | Yoon |
| 2006/0183473 A1 | 8/2006 | Ukon |
| 2006/0190063 A1 | 8/2006 | Kanzius |
| 2006/0192913 A1 | 8/2006 | Shutou et al. |
| 2006/0199620 A1 | 9/2006 | Greene et al. |
| 2006/0238365 A1 | 10/2006 | Vecchione et al. |
| 2006/0266564 A1 | 11/2006 | Perlman et al. |
| 2006/0266917 A1 | 11/2006 | Baldis et al. |
| 2006/0278706 A1 | 12/2006 | Hatakayama et al. |
| 2006/0284593 A1 | 12/2006 | Nagy et al. |
| 2006/0287094 A1 | 12/2006 | Mahaffey et al. |
| 2007/0007821 A1 | 1/2007 | Rossetti |
| 2007/0019693 A1 | 1/2007 | Graham |
| 2007/0021140 A1 | 1/2007 | Keyes |
| 2007/0060185 A1 | 3/2007 | Simon et al. |
| 2007/0070490 A1 | 3/2007 | Tsunoda et al. |
| 2007/0090997 A1 | 4/2007 | Brown et al. |
| 2007/0093269 A1 | 4/2007 | Leabman et al. |
| 2007/0097653 A1 | 5/2007 | Gilliland et al. |
| 2007/0103110 A1 | 5/2007 | Sagoo |
| 2007/0106894 A1 | 5/2007 | Zhang |
| 2007/0109121 A1 | 5/2007 | Cohen |
| 2007/0139000 A1 | 6/2007 | Kozuma |
| 2007/0149162 A1 | 6/2007 | Greene et al. |
| 2007/0164868 A1 | 7/2007 | Deavours et al. |
| 2007/0173196 A1 | 7/2007 | Gallic |
| 2007/0173214 A1 | 7/2007 | Mickle et al. |
| 2007/0178857 A1 | 8/2007 | Greene et al. |
| 2007/0178945 A1 | 8/2007 | Cook et al. |
| 2007/0182367 A1 | 8/2007 | Partovi |
| 2007/0191074 A1 | 8/2007 | Harrist et al. |
| 2007/0191075 A1 | 8/2007 | Greene et al. |
| 2007/0197281 A1 | 8/2007 | Stronach |
| 2007/0210960 A1 | 9/2007 | Rofougaran et al. |
| 2007/0222681 A1 | 9/2007 | Greene et al. |
| 2007/0228833 A1 | 10/2007 | Stevens et al. |
| 2007/0240297 A1 | 10/2007 | Yang et al. |
| 2007/0257634 A1 | 11/2007 | Leschin et al. |
| 2007/0273486 A1 | 11/2007 | Shiotsu |
| 2007/0291165 A1 | 12/2007 | Wang |
| 2007/0296639 A1 | 12/2007 | Hook et al. |
| 2007/0298846 A1 | 12/2007 | Greene et al. |
| 2008/0014897 A1 | 1/2008 | Cook et al. |
| 2008/0024376 A1 | 1/2008 | Norris et al. |
| 2008/0048917 A1 | 2/2008 | Achour et al. |
| 2008/0062062 A1 | 3/2008 | Borau et al. |
| 2008/0062255 A1 | 3/2008 | Gal |
| 2008/0067874 A1 | 3/2008 | Tseng |
| 2008/0074324 A1 | 3/2008 | Puzella et al. |
| 2008/0089277 A1 | 4/2008 | Aledander et al. |
| 2008/0110263 A1 | 5/2008 | Klessel et al. |
| 2008/0113816 A1 | 5/2008 | Mahaffey et al. |
| 2008/0122297 A1 | 5/2008 | Arai |
| 2008/0123383 A1 | 5/2008 | Shionoiri |
| 2008/0129536 A1 | 6/2008 | Randall et al. |
| 2008/0140278 A1 | 6/2008 | Breed |
| 2008/0169910 A1 | 7/2008 | Greene et al. |
| 2008/0197802 A1 | 8/2008 | Onishi |
| 2008/0204342 A1 | 8/2008 | Kharadly |
| 2008/0204350 A1 | 8/2008 | Tam et al. |
| 2008/0210762 A1 | 9/2008 | Osada et al. |
| 2008/0211458 A1 | 9/2008 | Lawther et al. |
| 2008/0233890 A1 | 9/2008 | Baker |
| 2008/0248758 A1 | 10/2008 | Schedelbeck et al. |
| 2008/0248846 A1 | 10/2008 | Stronach et al. |
| 2008/0258993 A1 | 10/2008 | Gummalla et al. |
| 2008/0266191 A1 | 10/2008 | Hilgers |
| 2008/0278378 A1 | 11/2008 | Chang et al. |
| 2008/0309452 A1 | 12/2008 | Zeine |
| 2009/0002493 A1 | 1/2009 | Kates |
| 2009/0010316 A1 | 1/2009 | Rofougaran et al. |
| 2009/0019183 A1 | 1/2009 | Wu et al. |
| 2009/0036065 A1 | 2/2009 | Siu |

(56) References Cited

U.S. PATENT DOCUMENTS

| | | |
|---|---|---|
| 2009/0039828 A1 | 2/2009 | Jakubowski |
| 2009/0047998 A1 | 2/2009 | Alberth, Jr. |
| 2009/0058354 A1 | 3/2009 | Harrison |
| 2009/0058361 A1 | 3/2009 | John |
| 2009/0058731 A1 | 3/2009 | Geary et al. |
| 2009/0060012 A1 | 3/2009 | Gresset et al. |
| 2009/0067198 A1 | 3/2009 | Graham et al. |
| 2009/0067208 A1 | 3/2009 | Martin et al. |
| 2009/0073066 A1 | 3/2009 | Jordon et al. |
| 2009/0096412 A1 | 4/2009 | Huang |
| 2009/0096413 A1 | 4/2009 | Partovi |
| 2009/0102292 A1 | 4/2009 | Cook et al. |
| 2009/0102296 A1 | 4/2009 | Greene et al. |
| 2009/0108679 A1 | 4/2009 | Porwal |
| 2009/0122847 A1 | 5/2009 | Nysen et al. |
| 2009/0128262 A1 | 5/2009 | Lee et al. |
| 2009/0157911 A1 | 6/2009 | Aihara |
| 2009/0174604 A1 | 7/2009 | Keskitalo |
| 2009/0180653 A1 | 7/2009 | Sjursen et al. |
| 2009/0200985 A1 | 8/2009 | Zane et al. |
| 2009/0206791 A1 | 8/2009 | Jung |
| 2009/0207090 A1 | 8/2009 | Pettus et al. |
| 2009/0207092 A1 | 8/2009 | Nysen et al. |
| 2009/0218884 A1 | 9/2009 | Soar |
| 2009/0218891 A1 | 9/2009 | McCollough |
| 2009/0219903 A1 | 9/2009 | Alamouti et al. |
| 2009/0243397 A1 | 10/2009 | Cook et al. |
| 2009/0256752 A1 | 10/2009 | Akkermans et al. |
| 2009/0264069 A1 | 10/2009 | Yamasuge |
| 2009/0271048 A1 | 10/2009 | Wakamatsu |
| 2009/0280866 A1 | 11/2009 | Lo et al. |
| 2009/0281678 A1 | 11/2009 | Wakamatsu |
| 2009/0284082 A1 | 11/2009 | Mohammadian |
| 2009/0284083 A1 | 11/2009 | Karalis et al. |
| 2009/0284220 A1 | 11/2009 | Toncich et al. |
| 2009/0284227 A1 | 11/2009 | Mohammadian et al. |
| 2009/0284325 A1 | 11/2009 | Rossiter et al. |
| 2009/0286475 A1 | 11/2009 | Toncich et al. |
| 2009/0286476 A1 | 11/2009 | Toncich et al. |
| 2009/0291634 A1 | 11/2009 | Saarisalo |
| 2009/0299175 A1 | 12/2009 | Bernstein et al. |
| 2009/0308936 A1 | 12/2009 | Nitzan et al. |
| 2009/0312046 A1 | 12/2009 | Clevenger et al. |
| 2009/0315412 A1 | 12/2009 | Yamamoto et al. |
| 2009/0322281 A1 | 12/2009 | Kamijo et al. |
| 2010/0001683 A1 | 1/2010 | Huang et al. |
| 2010/0007307 A1 | 1/2010 | Baarman et al. |
| 2010/0007569 A1 | 1/2010 | Sim et al. |
| 2010/0019686 A1 | 1/2010 | Gutierrez, Jr. |
| 2010/0019908 A1 | 1/2010 | Cho et al. |
| 2010/0026605 A1 | 2/2010 | Yang et al. |
| 2010/0027379 A1 | 2/2010 | Saulnier et al. |
| 2010/0029383 A1 | 2/2010 | Dai |
| 2010/0033021 A1 | 2/2010 | Bennett |
| 2010/0033390 A1 | 2/2010 | Alamouti et al. |
| 2010/0034238 A1 | 2/2010 | Bennett |
| 2010/0041453 A1 | 2/2010 | Grimm, Jr. |
| 2010/0044123 A1 | 2/2010 | Perlman et al. |
| 2010/0054200 A1 | 3/2010 | Tsai |
| 2010/0060534 A1 | 3/2010 | Oodachi |
| 2010/0066631 A1 | 3/2010 | Puzella et al. |
| 2010/0075607 A1 | 3/2010 | Hosoya |
| 2010/0079005 A1 | 4/2010 | Hyde et al. |
| 2010/0079011 A1 | 4/2010 | Hyde et al. |
| 2010/0082193 A1 | 4/2010 | Chiappetta |
| 2010/0087227 A1 | 4/2010 | Francos et al. |
| 2010/0090524 A1 | 4/2010 | Obayashi |
| 2010/0090656 A1 | 4/2010 | Shearer et al. |
| 2010/0109443 A1 | 5/2010 | Cook et al. |
| 2010/0117596 A1 | 5/2010 | Cook et al. |
| 2010/0117926 A1 | 5/2010 | DeJean, II |
| 2010/0119234 A1 | 5/2010 | Suematsu et al. |
| 2010/0123618 A1 | 5/2010 | Martin et al. |
| 2010/0123624 A1 | 5/2010 | Minear et al. |
| 2010/0124040 A1 | 5/2010 | Diebel et al. |
| 2010/0127660 A1 | 5/2010 | Cook et al. |
| 2010/0142418 A1 | 6/2010 | Nishioka et al. |
| 2010/0142509 A1 | 6/2010 | Zhu et al. |
| 2010/0148723 A1 | 6/2010 | Cook et al. |
| 2010/0151808 A1 | 6/2010 | Toncich et al. |
| 2010/0156721 A1 | 6/2010 | Alamouti et al. |
| 2010/0156741 A1 | 6/2010 | Vazquez et al. |
| 2010/0164296 A1 | 7/2010 | Kurs et al. |
| 2010/0164433 A1 | 7/2010 | Janefalker et al. |
| 2010/0167664 A1 | 7/2010 | SzinI |
| 2010/0171461 A1 | 7/2010 | Baarman et al. |
| 2010/0174629 A1 | 7/2010 | Taylor et al. |
| 2010/0176934 A1 | 7/2010 | Chou et al. |
| 2010/0181961 A1 | 7/2010 | Novak et al. |
| 2010/0181964 A1 | 7/2010 | Huggins et al. |
| 2010/0194206 A1 | 8/2010 | Burdo et al. |
| 2010/0201189 A1 | 8/2010 | Kirby et al. |
| 2010/0201201 A1 | 8/2010 | Mobarhan et al. |
| 2010/0201314 A1 | 8/2010 | Toncich et al. |
| 2010/0207572 A1 | 8/2010 | Kirby et al. |
| 2010/0210233 A1 | 8/2010 | Cook et al. |
| 2010/0213895 A1 | 8/2010 | Keating et al. |
| 2010/0214177 A1 | 8/2010 | Parsche |
| 2010/0222010 A1 | 9/2010 | Ozaki et al. |
| 2010/0225270 A1 | 9/2010 | Jacobs et al. |
| 2010/0227570 A1 | 9/2010 | Hendin |
| 2010/0231470 A1 | 9/2010 | Lee et al. |
| 2010/0237709 A1 | 9/2010 | Hall et al. |
| 2010/0244576 A1 | 9/2010 | Hillan et al. |
| 2010/0253281 A1 * | 10/2010 | Li ................... H02J 7/0027 320/108 |
| 2010/0256831 A1 | 10/2010 | Abramo et al. |
| 2010/0259110 A1 | 10/2010 | Kurs et al. |
| 2010/0259447 A1 | 10/2010 | Crouch |
| 2010/0264747 A1 | 10/2010 | Hall et al. |
| 2010/0277003 A1 | 11/2010 | Von Novak et al. |
| 2010/0277121 A1 | 11/2010 | Hall et al. |
| 2010/0279606 A1 | 11/2010 | Hillan et al. |
| 2010/0289341 A1 | 11/2010 | Ozaki et al. |
| 2010/0295372 A1 | 11/2010 | Hyde et al. |
| 2010/0308767 A1 | 12/2010 | Rofougaran et al. |
| 2010/0309079 A1 | 12/2010 | Rofougaran et al. |
| 2010/0309088 A1 | 12/2010 | Hyvonen et al. |
| 2010/0315045 A1 | 12/2010 | Zeine |
| 2010/0316163 A1 | 12/2010 | Forenza et al. |
| 2010/0327766 A1 | 12/2010 | Recker et al. |
| 2010/0328044 A1 | 12/2010 | Waffenschmidt et al. |
| 2010/0332401 A1 | 12/2010 | Prahlad et al. |
| 2011/0013198 A1 | 1/2011 | Shirley |
| 2011/0018360 A1 | 1/2011 | Baarman et al. |
| 2011/0028114 A1 | 2/2011 | Kerselaers |
| 2011/0031928 A1 | 2/2011 | Soar |
| 2011/0032149 A1 | 2/2011 | Leabman |
| 2011/0032866 A1 | 2/2011 | Leabman |
| 2011/0034190 A1 | 2/2011 | Leabman |
| 2011/0034191 A1 | 2/2011 | Leabman |
| 2011/0043047 A1 | 2/2011 | Karalis et al. |
| 2011/0043163 A1 | 2/2011 | Baarman et al. |
| 2011/0043327 A1 | 2/2011 | Baarman et al. |
| 2011/0050166 A1 | 3/2011 | Cook et al. |
| 2011/0055037 A1 | 3/2011 | Hayashigawa et al. |
| 2011/0056215 A1 | 3/2011 | Ham |
| 2011/0057607 A1 | 3/2011 | Carobolante |
| 2011/0057853 A1 | 3/2011 | Kim et al. |
| 2011/0062788 A1 | 3/2011 | Chen et al. |
| 2011/0074342 A1 | 3/2011 | MacLaughlin |
| 2011/0074349 A1 | 3/2011 | Ghovanloo |
| 2011/0074620 A1 | 3/2011 | Wintermantel |
| 2011/0078092 A1 | 3/2011 | Kim et al. |
| 2011/0090126 A1 | 4/2011 | Szini et al. |
| 2011/0109167 A1 | 5/2011 | Park et al. |
| 2011/0114401 A1 | 5/2011 | Kanno et al. |
| 2011/0115303 A1 | 5/2011 | Baarman et al. |
| 2011/0115432 A1 | 5/2011 | El-Maleh |
| 2011/0115605 A1 | 5/2011 | Dimig et al. |
| 2011/0121660 A1 | 5/2011 | Azancot et al. |
| 2011/0122018 A1 | 5/2011 | Tarng et al. |
| 2011/0122026 A1 | 5/2011 | DeLaquil et al. |
| 2011/0127845 A1 | 6/2011 | Walley et al. |

(56) References Cited

U.S. PATENT DOCUMENTS

| | | |
|---|---|---|
| 2011/0127952 A1 | 6/2011 | Walley et al. |
| 2011/0133655 A1 | 6/2011 | Recker et al. |
| 2011/0133691 A1 | 6/2011 | Hautanen |
| 2011/0148578 A1 | 6/2011 | Aloi et al. |
| 2011/0148595 A1 | 6/2011 | Miller et al. |
| 2011/0151789 A1 | 6/2011 | Viglione et al. |
| 2011/0154429 A1 | 6/2011 | Stantchev |
| 2011/0156494 A1 | 6/2011 | Mashinsky |
| 2011/0156640 A1 | 6/2011 | Moshfeghi |
| 2011/0163128 A1 | 7/2011 | Taguchi et al. |
| 2011/0175455 A1 | 7/2011 | Hashiguchi |
| 2011/0175461 A1 | 7/2011 | Tinaphong |
| 2011/0181120 A1 | 7/2011 | Liu et al. |
| 2011/0182245 A1 | 7/2011 | Malkamaki et al. |
| 2011/0184842 A1 | 7/2011 | Melen |
| 2011/0188207 A1 | 8/2011 | Won et al. |
| 2011/0193688 A1 | 8/2011 | Forsell |
| 2011/0194543 A1 | 8/2011 | Zhao et al. |
| 2011/0195722 A1 | 8/2011 | Walter et al. |
| 2011/0199046 A1 | 8/2011 | Tsai et al. |
| 2011/0215086 A1 | 9/2011 | Yeh |
| 2011/0217923 A1 | 9/2011 | Ma |
| 2011/0220634 A1 | 9/2011 | Yeh |
| 2011/0221389 A1 | 9/2011 | Won et al. |
| 2011/0222272 A1 | 9/2011 | Yeh |
| 2011/0227725 A1* | 9/2011 | Muirhead ......... B65D 19/0016 340/539.13 |
| 2011/0243040 A1 | 10/2011 | Khan et al. |
| 2011/0243050 A1 | 10/2011 | Yanover |
| 2011/0244913 A1 | 10/2011 | Kim et al. |
| 2011/0248573 A1 | 10/2011 | Kanno et al. |
| 2011/0248575 A1 | 10/2011 | Kim et al. |
| 2011/0249678 A1 | 10/2011 | Bonicatto |
| 2011/0254377 A1 | 10/2011 | Widmer et al. |
| 2011/0254503 A1 | 10/2011 | Widmer et al. |
| 2011/0259953 A1 | 10/2011 | Baarman et al. |
| 2011/0273977 A1 | 11/2011 | Shapira et al. |
| 2011/0278941 A1 | 11/2011 | Krishna et al. |
| 2011/0279226 A1 | 11/2011 | Chen et al. |
| 2011/0281535 A1 | 11/2011 | Low et al. |
| 2011/0282415 A1 | 11/2011 | Eckhoff et al. |
| 2011/0285213 A1 | 11/2011 | Kowalewski |
| 2011/0286374 A1 | 11/2011 | Shin et al. |
| 2011/0291489 A1 | 12/2011 | Tsai et al. |
| 2011/0302078 A1 | 12/2011 | Failing |
| 2011/0304216 A1 | 12/2011 | Baarman |
| 2011/0304437 A1 | 12/2011 | Beeler |
| 2011/0304521 A1 | 12/2011 | Ando et al. |
| 2012/0007441 A1 | 1/2012 | John |
| 2012/0013196 A1 | 1/2012 | Kim et al. |
| 2012/0013198 A1 | 1/2012 | Uramoto et al. |
| 2012/0013296 A1 | 1/2012 | Heydari et al. |
| 2012/0019419 A1 | 1/2012 | Prat et al. |
| 2012/0043887 A1 | 2/2012 | Mesibov |
| 2012/0051109 A1 | 3/2012 | Kim et al. |
| 2012/0051294 A1 | 3/2012 | Guillouard |
| 2012/0056486 A1 | 3/2012 | Endo et al. |
| 2012/0056741 A1 | 3/2012 | Zhu et al. |
| 2012/0068906 A1 | 3/2012 | Asher et al. |
| 2012/0074891 A1 | 3/2012 | Anderson et al. |
| 2012/0080944 A1 | 4/2012 | Recker et al. |
| 2012/0080957 A1 | 4/2012 | Cooper et al. |
| 2012/0086284 A1 | 4/2012 | Capanella et al. |
| 2012/0086615 A1 | 4/2012 | Norair |
| 2012/0095617 A1 | 4/2012 | Martin et al. |
| 2012/0098350 A1 | 4/2012 | Campanella et al. |
| 2012/0098485 A1 | 4/2012 | Kang et al. |
| 2012/0099675 A1 | 4/2012 | Kitamura et al. |
| 2012/0103562 A1 | 5/2012 | Clayton |
| 2012/0104849 A1 | 5/2012 | Jackson |
| 2012/0105252 A1 | 5/2012 | Wang |
| 2012/0112532 A1 | 5/2012 | Kesler et al. |
| 2012/0119914 A1 | 5/2012 | Uchida |
| 2012/0126743 A1 | 5/2012 | Rivers, Jr. |
| 2012/0132647 A1 | 5/2012 | Beverly et al. |
| 2012/0133214 A1 | 5/2012 | Yun et al. |
| 2012/0142291 A1 | 6/2012 | Rath et al. |
| 2012/0146426 A1 | 6/2012 | Sabo |
| 2012/0146576 A1 | 6/2012 | Partovi |
| 2012/0146577 A1 | 6/2012 | Tanabe |
| 2012/0147802 A1 | 6/2012 | Ukita et al. |
| 2012/0149307 A1 | 6/2012 | Terada et al. |
| 2012/0150670 A1 | 6/2012 | Taylor et al. |
| 2012/0153894 A1 | 6/2012 | Widmer et al. |
| 2012/0157019 A1 | 6/2012 | Li |
| 2012/0161531 A1 | 6/2012 | Kim et al. |
| 2012/0161544 A1 | 6/2012 | Kashiwagi et al. |
| 2012/0188142 A1 | 6/2012 | Shashi et al. |
| 2012/0169276 A1 | 7/2012 | Wang |
| 2012/0169278 A1 | 7/2012 | Choi |
| 2012/0173418 A1 | 7/2012 | Beardsmore et al. |
| 2012/0179004 A1 | 7/2012 | Roesicke et al. |
| 2012/0181973 A1 | 7/2012 | Lyden |
| 2012/0182427 A1 | 7/2012 | Marshall |
| 2012/0187851 A1 | 8/2012 | Huggins et al. |
| 2012/0193999 A1 | 8/2012 | Zeine |
| 2012/0200399 A1 | 8/2012 | Chae |
| 2012/0201153 A1 | 8/2012 | Bharadia et al. |
| 2012/0201173 A1 | 8/2012 | Jian et al. |
| 2012/0206299 A1 | 8/2012 | Valdes-Garcia |
| 2012/0211214 A1 | 8/2012 | Phan |
| 2012/0212071 A1 | 8/2012 | Myabayashi et al. |
| 2012/0212072 A1 | 8/2012 | Miyabayashi et al. |
| 2012/0214462 A1 | 8/2012 | Chu et al. |
| 2012/0214536 A1 | 8/2012 | Kim et al. |
| 2012/0228392 A1 | 9/2012 | Cameron et al. |
| 2012/0228956 A1 | 9/2012 | Kamata |
| 2012/0231856 A1 | 9/2012 | Lee et al. |
| 2012/0235636 A1 | 9/2012 | Partovi |
| 2012/0242283 A1 | 9/2012 | Kim et al. |
| 2012/0248886 A1 | 10/2012 | Kesler et al. |
| 2012/0248888 A1 | 10/2012 | Kesler et al. |
| 2012/0248891 A1 | 10/2012 | Drennen |
| 2012/0249051 A1 | 10/2012 | Son et al. |
| 2012/0262002 A1 | 10/2012 | Widmer et al. |
| 2012/0265272 A1 | 10/2012 | Judkins |
| 2012/0267900 A1 | 10/2012 | Huffman et al. |
| 2012/0268238 A1 | 10/2012 | Park et al. |
| 2012/0274154 A1 | 11/2012 | DeLuca |
| 2012/0280650 A1 | 11/2012 | Kim et al. |
| 2012/0286582 A1 | 11/2012 | Kim et al. |
| 2012/0292993 A1 | 11/2012 | Mettler et al. |
| 2012/0293021 A1 | 11/2012 | Teggatz et al. |
| 2012/0293119 A1 | 11/2012 | Park et al. |
| 2012/0299389 A1 | 11/2012 | Lee et al. |
| 2012/0299540 A1 | 11/2012 | Perry |
| 2012/0299541 A1 | 11/2012 | Perry |
| 2012/0299542 A1 | 11/2012 | Perry |
| 2012/0300588 A1 | 11/2012 | Perry |
| 2012/0300592 A1 | 11/2012 | Perry |
| 2012/0300593 A1 | 11/2012 | Perry |
| 2012/0306433 A1 | 12/2012 | Kim et al. |
| 2012/0306705 A1 | 12/2012 | Sakurai et al. |
| 2012/0306707 A1 | 12/2012 | Yang et al. |
| 2012/0306720 A1 | 12/2012 | Tanmi et al. |
| 2012/0307873 A1 | 12/2012 | Kim et al. |
| 2012/0309295 A1 | 12/2012 | Maguire |
| 2012/0309308 A1 | 12/2012 | Kim et al. |
| 2012/0309332 A1 | 12/2012 | Liao |
| 2012/0313449 A1 | 12/2012 | Kurs |
| 2012/0313835 A1 | 12/2012 | Gebretnsae |
| 2012/0326660 A1 | 12/2012 | Lu et al. |
| 2013/0002550 A1 | 1/2013 | Zalewski |
| 2013/0018439 A1 | 1/2013 | Chow et al. |
| 2013/0024059 A1 | 1/2013 | Miller et al. |
| 2013/0026981 A1 | 1/2013 | Van Der Lee |
| 2013/0026982 A1 | 1/2013 | Rothenbaum |
| 2013/0032589 A1 | 2/2013 | Chung |
| 2013/0033571 A1 | 2/2013 | Steen |
| 2013/0038124 A1 | 2/2013 | Newdoll et al. |
| 2013/0038402 A1 | 2/2013 | Karalis et al. |
| 2013/0043738 A1 | 2/2013 | Park et al. |
| 2013/0044035 A1 | 2/2013 | Zhuang |
| 2013/0049471 A1 | 2/2013 | Oleynik |

(56) References Cited

U.S. PATENT DOCUMENTS

| | | |
|---|---|---|
| 2013/0049475 A1 | 2/2013 | Kim et al. |
| 2013/0049484 A1 | 2/2013 | Weissentern et al. |
| 2013/0057078 A1 | 3/2013 | Lee |
| 2013/0057205 A1 | 3/2013 | Lee et al. |
| 2013/0057210 A1 | 3/2013 | Negaard et al. |
| 2013/0057364 A1 | 3/2013 | Kesler et al. |
| 2013/0058379 A1 | 3/2013 | Kim et al. |
| 2013/0063082 A1 | 3/2013 | Lee et al. |
| 2013/0063143 A1 | 3/2013 | Adalsteinsson et al. |
| 2013/0069444 A1 | 3/2013 | Waffenschmidt et al. |
| 2013/0076308 A1 | 3/2013 | Niskala et al. |
| 2013/0077650 A1 | 3/2013 | Traxler et al. |
| 2013/0078918 A1 | 3/2013 | Crowley et al. |
| 2013/0082651 A1 | 4/2013 | Park et al. |
| 2013/0082653 A1 | 4/2013 | Lee et al. |
| 2013/0083774 A1 | 4/2013 | Son et al. |
| 2013/0088082 A1 | 4/2013 | Kang et al. |
| 2013/0088090 A1 | 4/2013 | Wu |
| 2013/0088192 A1 | 4/2013 | Eaton |
| 2013/0088331 A1 | 4/2013 | Cho |
| 2013/0093388 A1 | 4/2013 | Partovi |
| 2013/0099389 A1 | 4/2013 | Hong et al. |
| 2013/0099586 A1 | 4/2013 | Kato |
| 2013/0106197 A1 | 5/2013 | Bae et al. |
| 2013/0107023 A1 | 5/2013 | Tanaka et al. |
| 2013/0119777 A1 | 5/2013 | Rees |
| 2013/0119778 A1 | 5/2013 | Jung |
| 2013/0119929 A1 | 5/2013 | Partovi |
| 2013/0120052 A1 | 5/2013 | Siska |
| 2013/0120205 A1 | 5/2013 | Thomson et al. |
| 2013/0120206 A1 | 5/2013 | Biancotto et al. |
| 2013/0120217 A1 | 5/2013 | Ueda et al. |
| 2013/0130621 A1 | 5/2013 | Kim et al. |
| 2013/0132010 A1 | 5/2013 | Winger et al. |
| 2013/0134923 A1 | 5/2013 | Smith |
| 2013/0137455 A1 | 5/2013 | Xia |
| 2013/0141037 A1 | 6/2013 | Jenwatanavet et al. |
| 2013/0148341 A1 | 6/2013 | Williams |
| 2013/0149975 A1 | 6/2013 | Yu et al. |
| 2013/0154387 A1 | 6/2013 | Lee et al. |
| 2013/0155748 A1 | 6/2013 | Sundstrom |
| 2013/0157729 A1 | 6/2013 | Tabe |
| 2013/0162335 A1 | 6/2013 | Kim et al. |
| 2013/0169061 A1 | 7/2013 | Microshnichenko et al. |
| 2013/0169219 A1 | 7/2013 | Gray |
| 2013/0169348 A1 | 7/2013 | Shi |
| 2013/0171939 A1 | 7/2013 | Tian et al. |
| 2013/0175877 A1 | 7/2013 | Abe et al. |
| 2013/0178253 A1 | 7/2013 | Karaoguz |
| 2013/0181881 A1 | 7/2013 | Christie et al. |
| 2013/0187475 A1 | 7/2013 | Vendik |
| 2013/0190031 A1 | 7/2013 | Persson et al. |
| 2013/0193769 A1 | 8/2013 | Mehta et al. |
| 2013/0197320 A1 | 8/2013 | Albert et al. |
| 2013/0200064 A1 | 8/2013 | Alexander |
| 2013/0207477 A1 | 8/2013 | Nam et al. |
| 2013/0207604 A1 | 8/2013 | Zeine |
| 2013/0207879 A1 | 8/2013 | Rada et al. |
| 2013/0210357 A1 | 8/2013 | Qin et al. |
| 2013/0221757 A1 | 8/2013 | Cho et al. |
| 2013/0222201 A1 | 8/2013 | Ma et al. |
| 2013/0234530 A1 | 9/2013 | Miyauchi |
| 2013/0234536 A1 | 9/2013 | Chemishkian et al. |
| 2013/0234658 A1 | 9/2013 | Endo et al. |
| 2013/0241306 A1 | 9/2013 | Aber et al. |
| 2013/0241468 A1 | 9/2013 | Moshfeghi |
| 2013/0241474 A1 | 9/2013 | Moshfeghi |
| 2013/0249478 A1 | 9/2013 | Hirano |
| 2013/0249479 A1 | 9/2013 | Partovi |
| 2013/0250102 A1 | 9/2013 | Scanlon et al. |
| 2013/0254578 A1 | 9/2013 | Huang et al. |
| 2013/0264997 A1 | 10/2013 | Lee et al. |
| 2013/0268782 A1 | 10/2013 | Tam et al. |
| 2013/0270923 A1 | 10/2013 | Cook et al. |
| 2013/0278076 A1 | 10/2013 | Proud |
| 2013/0278209 A1 | 10/2013 | Von Novak |
| 2013/0285464 A1 | 10/2013 | Miwa |
| 2013/0285477 A1 | 10/2013 | Lo et al. |
| 2013/0285606 A1 | 10/2013 | Ben-Shalom et al. |
| 2013/0288600 A1 | 10/2013 | Kuusilinna et al. |
| 2013/0288617 A1 | 10/2013 | Kim et al. |
| 2013/0293423 A1 | 11/2013 | Moshfeghi |
| 2013/0307751 A1 | 11/2013 | Yu-Juin et al. |
| 2013/0310020 A1 | 11/2013 | Kazuhiro |
| 2013/0311798 A1 | 11/2013 | Sultenfuss |
| 2013/0328417 A1 | 12/2013 | Takeuchi |
| 2013/0334883 A1 | 12/2013 | Kim et al. |
| 2013/0339108 A1 | 12/2013 | Ryder et al. |
| 2013/0343208 A1 | 12/2013 | Sexton et al. |
| 2013/0343251 A1 | 12/2013 | Zhang |
| 2014/0001846 A1 | 1/2014 | Mosebrook |
| 2014/0001875 A1 | 1/2014 | Nahidipour |
| 2014/0001876 A1 | 1/2014 | Fujiwara et al. |
| 2014/0006017 A1 | 1/2014 | Sen |
| 2014/0008992 A1 | 1/2014 | Leabman |
| 2014/0008993 A1 | 1/2014 | Leabman |
| 2014/0009108 A1 | 1/2014 | Leabman |
| 2014/0009110 A1 | 1/2014 | Lee |
| 2014/0011531 A1 | 1/2014 | Burstrom et al. |
| 2014/0015336 A1 | 1/2014 | Weber et al. |
| 2014/0015344 A1 | 1/2014 | Mohamadi |
| 2014/0021907 A1 | 1/2014 | Yun et al. |
| 2014/0021908 A1 | 1/2014 | McCool |
| 2014/0035524 A1 | 2/2014 | Zeine |
| 2014/0035526 A1 | 2/2014 | Tripathi et al. |
| 2014/0035786 A1 | 2/2014 | Ley |
| 2014/0043248 A1 | 2/2014 | Yeh |
| 2014/0049422 A1 | 2/2014 | Von Novak et al. |
| 2014/0054971 A1 | 2/2014 | Kissin |
| 2014/0055098 A1 | 2/2014 | Lee et al. |
| 2014/0057618 A1 | 2/2014 | Zirwas et al. |
| 2014/0062395 A1 | 3/2014 | Kwon et al. |
| 2014/0082435 A1 | 3/2014 | Kitgawa |
| 2014/0086125 A1 | 3/2014 | Polo et al. |
| 2014/0086592 A1 | 3/2014 | Nakahara et al. |
| 2014/0091756 A1 | 4/2014 | Ofstein et al. |
| 2014/0091968 A1 | 4/2014 | Harel et al. |
| 2014/0091974 A1 | 4/2014 | Desclos et al. |
| 2014/0103869 A1 | 4/2014 | Radovic |
| 2014/0104157 A1 | 4/2014 | Burns |
| 2014/0111147 A1 | 4/2014 | Soar |
| 2014/0113689 A1 | 4/2014 | Lee |
| 2014/0117946 A1 | 5/2014 | Muller et al. |
| 2014/0118140 A1 | 5/2014 | Amis |
| 2014/0128107 A1 | 5/2014 | An |
| 2014/0132210 A1 | 5/2014 | Partovi |
| 2014/0133279 A1 | 5/2014 | Khuri-Yakub |
| 2014/0139034 A1 | 5/2014 | Sankar et al. |
| 2014/0139039 A1 | 5/2014 | Cook et al. |
| 2014/0139180 A1 | 5/2014 | Kim et al. |
| 2014/0141838 A1 | 5/2014 | Cai et al. |
| 2014/0142876 A1 | 5/2014 | John et al. |
| 2014/0143933 A1 | 5/2014 | Low et al. |
| 2014/0145879 A1 | 5/2014 | Pan |
| 2014/0145884 A1 | 5/2014 | Dang et al. |
| 2014/0152117 A1 | 6/2014 | Sanker |
| 2014/0159651 A1 | 6/2014 | Von Novak et al. |
| 2014/0159652 A1 | 6/2014 | Hall et al. |
| 2014/0159662 A1 | 6/2014 | Furui |
| 2014/0159667 A1 | 6/2014 | Kim et al. |
| 2014/0169385 A1 | 6/2014 | Hadani et al. |
| 2014/0175893 A1 | 6/2014 | Sengupta et al. |
| 2014/0176054 A1 | 6/2014 | Porat et al. |
| 2014/0176061 A1 | 6/2014 | Cheatham, III et al. |
| 2014/0176082 A1 | 6/2014 | Visser |
| 2014/0177399 A1 | 6/2014 | Teng et al. |
| 2014/0184148 A1 | 7/2014 | Van Der Lee et al. |
| 2014/0184155 A1 | 7/2014 | Cha |
| 2014/0184163 A1 | 7/2014 | Das et al. |
| 2014/0184170 A1 | 7/2014 | Jeong |
| 2014/0191568 A1 | 7/2014 | Partovi |
| 2014/0191818 A1 | 7/2014 | Waffenschmidt et al. |
| 2014/0194092 A1 | 7/2014 | Wanstedt et al. |
| 2014/0194095 A1 | 7/2014 | Wanstedt et al. |

(56) References Cited

U.S. PATENT DOCUMENTS

| | | |
|---|---|---|
| 2014/0197691 A1 | 7/2014 | Wang |
| 2014/0203629 A1 | 7/2014 | Hoffman et al. |
| 2014/0206384 A1 | 7/2014 | Kim et al. |
| 2014/0210281 A1 | 7/2014 | Ito et al. |
| 2014/0217955 A1 | 8/2014 | Lin |
| 2014/0217967 A1 | 8/2014 | Zeine et al. |
| 2014/0225805 A1 | 8/2014 | Pan et al. |
| 2014/0232320 A1 | 8/2014 | Ento July et al. |
| 2014/0232610 A1 | 8/2014 | Shigemoto et al. |
| 2014/0239733 A1 | 8/2014 | Mach et al. |
| 2014/0241231 A1 | 8/2014 | Zeine |
| 2014/0245036 A1 | 8/2014 | Oishi |
| 2014/0246416 A1 | 9/2014 | White |
| 2014/0247152 A1 | 9/2014 | Proud |
| 2014/0252813 A1 | 9/2014 | Lee et al. |
| 2014/0252866 A1 | 9/2014 | Walsh et al. |
| 2014/0265725 A1 | 9/2014 | Angle et al. |
| 2014/0265727 A1 | 9/2014 | Berte |
| 2014/0265943 A1 | 9/2014 | Angle et al. |
| 2014/0266025 A1 | 9/2014 | Jakubowski |
| 2014/0266946 A1 | 9/2014 | Bily et al. |
| 2014/0273892 A1 | 9/2014 | Nourbakhsh |
| 2014/0281655 A1 | 9/2014 | Angle et al. |
| 2014/0292090 A1 | 10/2014 | Cordeiro et al. |
| 2014/0292451 A1 | 10/2014 | Zimmerman |
| 2014/0300452 A1 | 10/2014 | Rofe et al. |
| 2014/0312706 A1 | 10/2014 | Fiorello et al. |
| 2014/0325218 A1 | 10/2014 | Shimizu et al. |
| 2014/0327320 A1 | 11/2014 | Muhs et al. |
| 2014/0327390 A1 | 11/2014 | Park et al. |
| 2014/0333142 A1 | 11/2014 | Desrosiers |
| 2014/0346860 A1 | 11/2014 | Aubry et al. |
| 2014/0354063 A1 | 12/2014 | Leabman et al. |
| 2014/0354221 A1 | 12/2014 | Leabman et al. |
| 2014/0355718 A1 | 12/2014 | Guan et al. |
| 2014/0357309 A1 | 12/2014 | Leabman et al. |
| 2014/0368048 A1 | 12/2014 | Leabman |
| 2014/0368161 A1 | 12/2014 | Leabman et al. |
| 2014/0368405 A1 | 12/2014 | Ek et al. |
| 2014/0375139 A1 | 12/2014 | Tsukamoto |
| 2014/0375253 A1 | 12/2014 | Leabman et al. |
| 2014/0375255 A1 | 12/2014 | Leabman et al. |
| 2014/0375258 A1 | 12/2014 | Arkhipenkov |
| 2014/0375261 A1 | 12/2014 | Manova-Elssibony et al. |
| 2014/0376646 A1 | 12/2014 | Leabman et al. |
| 2015/0001949 A1 | 1/2015 | Leabman et al. |
| 2015/0002086 A1 | 1/2015 | Matos et al. |
| 2015/0003207 A1 | 1/2015 | Lee et al. |
| 2015/0008980 A1 | 1/2015 | Kim et al. |
| 2015/0011160 A1 | 1/2015 | Uurgovan et al. |
| 2015/0015180 A1 | 1/2015 | Miller et al. |
| 2015/0015182 A1 | 1/2015 | Brandtman et al. |
| 2015/0015192 A1 | 1/2015 | Leabamn |
| 2015/0015194 A1 | 1/2015 | Leabman et al. |
| 2015/0015195 A1 | 1/2015 | Leabman et al. |
| 2015/0021990 A1 | 1/2015 | Myer et al. |
| 2015/0022008 A1 | 1/2015 | Leabman et al. |
| 2015/0022009 A1 | 1/2015 | Leabman et al. |
| 2015/0022010 A1 | 1/2015 | Leabman et al. |
| 2015/0022194 A1 | 1/2015 | Almalki et al. |
| 2015/0023204 A1 | 1/2015 | Wil et al. |
| 2015/0028688 A1 | 1/2015 | Masaoka |
| 2015/0028694 A1 | 1/2015 | Leabman et al. |
| 2015/0028697 A1 | 1/2015 | Leabman et al. |
| 2015/0028875 A1 | 1/2015 | Irie et al. |
| 2015/0029397 A1 | 1/2015 | Leabman et al. |
| 2015/0035378 A1 | 2/2015 | Calhoun et al. |
| 2015/0035715 A1 | 2/2015 | Kim et al. |
| 2015/0039482 A1 | 2/2015 | Fuinaga |
| 2015/0041459 A1 | 2/2015 | Leabman et al. |
| 2015/0042264 A1 | 2/2015 | Leabman et al. |
| 2015/0042265 A1 | 2/2015 | Leabman et al. |
| 2015/0044977 A1 | 2/2015 | Ramasamy et al. |
| 2015/0046526 A1 | 2/2015 | Bush et al. |
| 2015/0061404 A1 | 3/2015 | Lamenza et al. |
| 2015/0076917 A1 | 3/2015 | Leabman et al. |
| 2015/0076927 A1 | 3/2015 | Leabman et al. |
| 2015/0077036 A1 | 3/2015 | Leabman et al. |
| 2015/0077037 A1 | 3/2015 | Leabman et al. |
| 2015/0091520 A1 | 4/2015 | Blum et al. |
| 2015/0091706 A1 | 4/2015 | Chemishkian et al. |
| 2015/0097442 A1 | 4/2015 | Muurinen |
| 2015/0097663 A1 | 4/2015 | Sloo et al. |
| 2015/0102681 A1 | 4/2015 | Leabman et al. |
| 2015/0102764 A1 | 4/2015 | Leabman et al. |
| 2015/0102769 A1 | 4/2015 | Leabman et al. |
| 2015/0102973 A1 | 4/2015 | Hand et al. |
| 2015/0108848 A1 | 4/2015 | Joehren |
| 2015/0109181 A1 | 4/2015 | Hyde et al. |
| 2015/0115877 A1 | 4/2015 | Aria et al. |
| 2015/0115878 A1 | 4/2015 | Park |
| 2015/0116153 A1 | 4/2015 | Chen et al. |
| 2015/0123483 A1 | 5/2015 | Leabman et al. |
| 2015/0123496 A1 | 5/2015 | Leabman et al. |
| 2015/0128733 A1 | 5/2015 | Taylor et al. |
| 2015/0130285 A1 | 5/2015 | Leabman et al. |
| 2015/0130293 A1 | 5/2015 | Hajimiri et al. |
| 2015/0137612 A1 | 5/2015 | Yamakawa et al. |
| 2015/0148664 A1 | 5/2015 | Stolka et al. |
| 2015/0155737 A1 | 6/2015 | Mayo |
| 2015/0155738 A1 | 6/2015 | Leabman et al. |
| 2015/0162751 A1 | 6/2015 | Leabman et al. |
| 2015/0162779 A1 | 6/2015 | Lee et al. |
| 2015/0171512 A1 | 6/2015 | Chen et al. |
| 2015/0171513 A1 | 6/2015 | Chen et al. |
| 2015/0171656 A1 | 6/2015 | Leabman et al. |
| 2015/0171658 A1 | 6/2015 | Manova-Elssibony et al. |
| 2015/0171931 A1 | 6/2015 | Won et al. |
| 2015/0177326 A1 | 6/2015 | Chakraborty et al. |
| 2015/0180133 A1 | 6/2015 | Hunt |
| 2015/0180249 A1 | 6/2015 | Jeon et al. |
| 2015/0181117 A1 | 6/2015 | Park et al. |
| 2015/0187491 A1 | 7/2015 | Yanagawa |
| 2015/0188352 A1 | 7/2015 | Peek et al. |
| 2015/0199665 A1 | 7/2015 | Chu |
| 2015/0201385 A1 | 7/2015 | Mercer et al. |
| 2015/0207333 A1 | 7/2015 | Baarman et al. |
| 2015/0207542 A1 | 7/2015 | Zeine |
| 2015/0222126 A1 | 8/2015 | Leabman et al. |
| 2015/0233987 A1 | 8/2015 | Von Novak, III et al. |
| 2015/0234144 A1 | 8/2015 | Cameron et al. |
| 2015/0236520 A1 | 8/2015 | Baarman |
| 2015/0244070 A1 | 8/2015 | Cheng et al. |
| 2015/0244080 A1 | 8/2015 | Gregoire |
| 2015/0244187 A1 | 8/2015 | Horie |
| 2015/0244201 A1 | 8/2015 | Chu |
| 2015/0244341 A1 | 8/2015 | Ritter et al. |
| 2015/0249484 A1 | 9/2015 | Mach et al. |
| 2015/0255989 A1 | 9/2015 | Walley et al. |
| 2015/0256097 A1 | 9/2015 | Gudan et al. |
| 2015/0260835 A1 | 9/2015 | Widmer et al. |
| 2015/0263534 A1 | 9/2015 | Lee et al. |
| 2015/0263548 A1 | 9/2015 | Cooper |
| 2015/0270618 A1 | 9/2015 | Zhu et al. |
| 2015/0270622 A1 | 9/2015 | Takasaki et al. |
| 2015/0270741 A1 | 9/2015 | Leabman et al. |
| 2015/0280484 A1 | 10/2015 | Radziemski et al. |
| 2015/0288074 A1 | 10/2015 | Harper et al. |
| 2015/0288438 A1 | 10/2015 | Maltsev et al. |
| 2015/0311585 A1 | 10/2015 | Church et al. |
| 2015/0312721 A1 | 10/2015 | Singh |
| 2015/0318729 A1 | 11/2015 | Leabman |
| 2015/0326024 A1 | 11/2015 | Bell et al. |
| 2015/0326025 A1 | 11/2015 | Bell et al. |
| 2015/0326051 A1 | 11/2015 | Bell et al. |
| 2015/0326063 A1 | 11/2015 | Leabman et al. |
| 2015/0326068 A1 | 11/2015 | Bell et al. |
| 2015/0326069 A1 | 11/2015 | Petras et al. |
| 2015/0326070 A1 | 11/2015 | Petras et al. |
| 2015/0326071 A1 | 11/2015 | Contopanagos |
| 2015/0326072 A1 | 11/2015 | Petras et al. |
| 2015/0326142 A1 | 11/2015 | Petras et al. |
| 2015/0326143 A1 | 11/2015 | Petras et al. |
| 2015/0327085 A1 | 11/2015 | Hadani |

(56) References Cited

U.S. PATENT DOCUMENTS

| | | |
|---|---|---|
| 2015/0333528 A1 | 11/2015 | Leabman |
| 2015/0333529 A1 | 11/2015 | Leabman |
| 2015/0333573 A1 | 11/2015 | Leabman |
| 2015/0333800 A1 | 11/2015 | Perry et al. |
| 2015/0340759 A1 | 11/2015 | Bridgelall et al. |
| 2015/0340903 A1 | 11/2015 | Bell et al. |
| 2015/0340909 A1 | 11/2015 | Bell et al. |
| 2015/0340910 A1 | 11/2015 | Petras et al. |
| 2015/0340911 A1 | 11/2015 | Bell et al. |
| 2015/0341087 A1 | 11/2015 | Moore et al. |
| 2015/0349574 A1 | 12/2015 | Leabman |
| 2015/0358222 A1 | 12/2015 | Berger et al. |
| 2015/0365137 A1 | 12/2015 | Miller et al. |
| 2015/0365138 A1 | 12/2015 | Miller et al. |
| 2016/0005068 A1 | 1/2016 | Im et al. |
| 2016/0012695 A1 | 1/2016 | Bell et al. |
| 2016/0013560 A1 | 1/2016 | Daniels |
| 2016/0013656 A1 | 1/2016 | Bell et al. |
| 2016/0013677 A1 | 1/2016 | Bell et al. |
| 2016/0013678 A1 | 1/2016 | Bell et al. |
| 2016/0013855 A1 | 1/2016 | Campos |
| 2016/0020636 A1 | 1/2016 | Khlat |
| 2016/0020647 A1 | 1/2016 | Leabman et al. |
| 2016/0020649 A1 | 1/2016 | Bell et al. |
| 2016/0020830 A1 | 1/2016 | Bell et al. |
| 2016/0028403 A1 | 1/2016 | McCaughan et al. |
| 2016/0042206 A1 | 2/2016 | Pesavento et al. |
| 2016/0043571 A1* | 2/2016 | Kesler ................... H02J 50/12 307/104 |
| 2016/0054395 A1 | 2/2016 | Bell et al. |
| 2016/0054396 A1 | 2/2016 | Bell et al. |
| 2016/0054440 A1 | 2/2016 | Younis |
| 2016/0056635 A1 | 2/2016 | Bell |
| 2016/0056640 A1 | 2/2016 | Mao |
| 2016/0056669 A1 | 2/2016 | Bell |
| 2016/0056966 A1 | 2/2016 | Bell |
| 2016/0065005 A1 | 3/2016 | Won et al. |
| 2016/0079799 A1 | 3/2016 | Khlat |
| 2016/0087483 A1 | 3/2016 | Hietala et al. |
| 2016/0087486 A1 | 3/2016 | Pogorelik et al. |
| 2016/0094091 A1 | 3/2016 | Shin et al. |
| 2016/0094092 A1 | 3/2016 | Davlantes et al. |
| 2016/0099601 A1 | 4/2016 | Leabman et al. |
| 2016/0099602 A1 | 4/2016 | Leabman et al. |
| 2016/0099609 A1 | 4/2016 | Leabman et al. |
| 2016/0099610 A1 | 4/2016 | Leabman et al. |
| 2016/0099611 A1 | 4/2016 | Leabman et al. |
| 2016/0099612 A1 | 4/2016 | Leabman et al. |
| 2016/0099613 A1 | 4/2016 | Leabman et al. |
| 2016/0099614 A1 | 4/2016 | Leabman et al. |
| 2016/0099755 A1 | 4/2016 | Leabman et al. |
| 2016/0099756 A1 | 4/2016 | Leabman et al. |
| 2016/0099757 A1 | 4/2016 | Leabman et al. |
| 2016/0099758 A1 | 4/2016 | Leabman et al. |
| 2016/0100124 A1 | 4/2016 | Leabman et al. |
| 2016/0100312 A1 | 4/2016 | Bell et al. |
| 2016/0112787 A1 | 4/2016 | Rich |
| 2016/0126749 A1 | 5/2016 | Shichino et al. |
| 2016/0126752 A1 | 5/2016 | Vuori et al. |
| 2016/0126776 A1 | 5/2016 | Kim et al. |
| 2016/0141908 A1 | 5/2016 | Jakl et al. |
| 2016/0164563 A1 | 6/2016 | Khawand et al. |
| 2016/0181849 A1 | 6/2016 | Govindaraj |
| 2016/0181854 A1 | 6/2016 | Leabman |
| 2016/0181867 A1 | 6/2016 | Daniel et al. |
| 2016/0181873 A1 | 6/2016 | Mitcheson et al. |
| 2016/0191121 A1 | 6/2016 | Bell |
| 2016/0202343 A1 | 7/2016 | Okutsu |
| 2016/0204622 A1 | 7/2016 | Leabman |
| 2016/0204642 A1 | 7/2016 | Oh |
| 2016/0233582 A1 | 8/2016 | Piskun |
| 2016/0238365 A1 | 8/2016 | Wixey et al. |
| 2016/0240908 A1 | 8/2016 | Strong |
| 2016/0248276 A1 | 8/2016 | Hong et al. |
| 2016/0294225 A1 | 10/2016 | Blum et al. |
| 2016/0299210 A1 | 10/2016 | Zeine |
| 2016/0301240 A1 | 10/2016 | Zeine |
| 2016/0322868 A1 | 11/2016 | Akuzawa et al. |
| 2016/0323000 A1 | 11/2016 | Liu et al. |
| 2016/0336804 A1 | 11/2016 | Son et al. |
| 2016/0339258 A1 | 11/2016 | Perryman et al. |
| 2016/0344098 A1* | 11/2016 | Ming ................... H01Q 21/0087 |
| 2016/0359367 A1 | 12/2016 | Rothschild |
| 2016/0380464 A1 | 12/2016 | Chin et al. |
| 2016/0380466 A1 | 12/2016 | Yang et al. |
| 2017/0005481 A1 | 1/2017 | Von Novak, III |
| 2017/0005516 A9 | 1/2017 | Leabman et al. |
| 2017/0005524 A1 | 1/2017 | Akuzawa et al. |
| 2017/0005530 A1 | 1/2017 | Zeine et al. |
| 2017/0012448 A1 | 1/2017 | Miller et al. |
| 2017/0025903 A1 | 1/2017 | Song et al. |
| 2017/0026087 A1 | 1/2017 | Tanabe |
| 2017/0040700 A1 | 2/2017 | Leung |
| 2017/0043675 A1 | 2/2017 | Jones et al. |
| 2017/0047784 A1 | 2/2017 | Jung et al. |
| 2017/0187225 A1 | 2/2017 | Hosseini |
| 2017/0063168 A1 | 3/2017 | Uchida |
| 2017/0077733 A1 | 3/2017 | Jeong et al. |
| 2017/0077735 A1 | 3/2017 | Leabman |
| 2017/0077736 A1 | 3/2017 | Leabman |
| 2017/0077764 A1 | 3/2017 | Bell et al. |
| 2017/0077765 A1 | 3/2017 | Bell et al. |
| 2017/0077979 A1* | 3/2017 | Papa ................... H04B 1/40 |
| 2017/0077995 A1 | 3/2017 | Leabman |
| 2017/0085112 A1 | 3/2017 | Leabman et al. |
| 2017/0085120 A1 | 3/2017 | Leabman et al. |
| 2017/0085127 A1 | 3/2017 | Leabman |
| 2017/0085437 A1 | 3/2017 | Condeixa et al. |
| 2017/0092115 A1 | 3/2017 | Sloo et al. |
| 2017/0104263 A1 | 4/2017 | Hosseini |
| 2017/0110887 A1 | 4/2017 | Bell et al. |
| 2017/0110888 A1 | 4/2017 | Leabman |
| 2017/0110889 A1 | 4/2017 | Bell |
| 2017/0110914 A1 | 4/2017 | Bell |
| 2017/0127196 A1 | 5/2017 | Blum et al. |
| 2017/0134686 A9 | 5/2017 | Leabman |
| 2017/0141582 A1 | 5/2017 | Adolf et al. |
| 2017/0141583 A1 | 5/2017 | Adolf et al. |
| 2017/0163076 A1 | 6/2017 | Park et al. |
| 2017/0168595 A1 | 6/2017 | Sakaguchi et al. |
| 2017/0179763 A9 | 6/2017 | Leabman |
| 2017/0179771 A1 | 6/2017 | Leabman |
| 2017/0187198 A1 | 6/2017 | Leabman |
| 2017/0187222 A1 | 6/2017 | Hosseini |
| 2017/0187223 A1 | 6/2017 | Hosseini |
| 2017/0187224 A1 | 6/2017 | Hosseini |
| 2017/0187228 A1 | 6/2017 | Hosseini |
| 2017/0187247 A1 | 6/2017 | Leabman |
| 2017/0187248 A1 | 6/2017 | Leabman |
| 2017/0187422 A1 | 6/2017 | Hosseini |
| 2017/0214422 A1 | 7/2017 | Na et al. |
| 2017/0338695 A1 | 11/2017 | Port |
| 2018/0040929 A1 | 2/2018 | Chappelle |
| 2018/0048178 A1 | 2/2018 | Leabman |
| 2018/0123400 A1 | 5/2018 | Leabman |
| 2018/0131238 A1 | 5/2018 | Leabman |
| 2018/0159338 A1 | 6/2018 | Leabman et al. |
| 2018/0159355 A1 | 6/2018 | Leabman |
| 2018/0166924 A1 | 6/2018 | Hosseini |
| 2018/0166925 A1 | 6/2018 | Hosseini |
| 2018/0212474 A1 | 7/2018 | Hosseini |
| 2018/0226840 A1 | 8/2018 | Leabman |
| 2018/0241255 A1 | 8/2018 | Leabman |
| 2018/0248409 A1 | 8/2018 | Johnston |
| 2018/0254639 A1 | 9/2018 | Bell |
| 2018/0262014 A1 | 9/2018 | Bell |
| 2018/0262040 A1 | 9/2018 | Contopanagos |
| 2018/0262060 A1 | 9/2018 | Johnston |
| 2018/0269570 A1 | 9/2018 | Hosseini |
| 2018/0287431 A1 | 10/2018 | Liu et al. |
| 2018/0331429 A1 | 11/2018 | Kornaros |
| 2018/0331581 A1 | 11/2018 | Hosseini |
| 2018/0337534 A1 | 11/2018 | Bell et al. |
| 2018/0375340 A1 | 12/2018 | Bell et al. |

(56) References Cited

U.S. PATENT DOCUMENTS

| | | |
|---|---|---|
| 2018/0375368 A1 | 12/2018 | Leabman |
| 2018/0376235 A1 | 12/2018 | Leabman |
| 2019/0052115 A1 | 2/2019 | Hosseini |
| 2019/0074133 A1 | 3/2019 | Contopanagos |
| 2019/0074728 A1 | 3/2019 | Leabman |
| 2019/0089203 A1 | 3/2019 | Leabman |
| 2019/0131827 A1 | 5/2019 | Johnston |
| 2019/0173323 A1 | 6/2019 | Hosseini |
| 2019/0222070 A1 | 7/2019 | Leabman |
| 2019/0245389 A1 | 8/2019 | Johnston et al. |

FOREIGN PATENT DOCUMENTS

| | | |
|---|---|---|
| CN | 203826555 U | 9/2014 |
| CN | 104090265 A | 10/2014 |
| CN | 103380561 B | 9/2017 |
| DE | 200216655 U1 | 2/2002 |
| DE | 10-2003216953 A1 | 2/2015 |
| EP | 1028482 A2 | 8/2000 |
| EP | 1081506 A1 | 3/2001 |
| EP | 2397973 A1 | 6/2010 |
| EP | 2346136 A1 | 7/2011 |
| EP | 2545635 A2 | 1/2013 |
| EP | 2747195 A1 | 6/2014 |
| EP | 3067983 A1 | 9/2016 |
| EP | 3118970 A1 | 1/2017 |
| EP | 3145052 A1 | 3/2017 |
| GB | 2404497 A | 2/2005 |
| JP | 2002319816 A | 10/2002 |
| JP | 2006157586 A | 6/2006 |
| JP | 2007043432 A | 2/2007 |
| JP | 2008167017 A | 7/2008 |
| JP | 2013162624 A | 8/2013 |
| JP | 2015128349 A | 7/2015 |
| JP | WO2015177859 A1 | 4/2017 |
| KR | 20060061776 A | 6/2006 |
| KR | 20070044302 A | 4/2007 |
| KR | 100755144 B1 | 9/2007 |
| KR | 20110132059 A | 12/2011 |
| KR | 20110135540 A1 | 12/2011 |
| KR | 20120009843 A | 2/2012 |
| KR | 20120108759 A | 10/2012 |
| KR | 20130026977 A | 3/2013 |
| KR | 20140023409 A | 2/2014 |
| KR | 20140085200 A | 7/2014 |
| KR | 20150077678 A | 7/2015 |
| WO | WO 1995008125 A1 | 3/1995 |
| WO | WO 1998031070 A1 | 7/1998 |
| WO | WO 9952173 | 10/1999 |
| WO | WO 200111716 A1 | 2/2001 |
| WO | WO 2003091943 A1 | 11/2003 |
| WO | WO 2004077550 A1 | 9/2004 |
| WO | WO 2006122783 | 11/2006 |
| WO | WO 2007070571 A2 | 6/2007 |
| WO | WO 2008024993 A2 | 2/2008 |
| WO | WO 2008156571 A2 | 12/2008 |
| WO | WO 2010022181 A1 | 2/2010 |
| WO | WO 2010039246 A1 | 4/2010 |
| WO | WO 2010138994 A1 | 12/2010 |
| WO | WO 2011112022 A2 | 9/2011 |
| WO | WO 2012177283 A1 | 12/2012 |
| WO | WO 2013031988 A1 | 3/2013 |
| WO | WO 2013035190 A1 | 3/2013 |
| WO | WO 2013038074 A2 | 3/2013 |
| WO | WO 2013042399 A1 | 3/2013 |
| WO | WO 2013052950 A1 | 4/2013 |
| WO | WO 2013105920 A2 | 7/2013 |
| WO | WO 2014075103 A1 | 5/2014 |
| WO | WO 2014132258 A1 | 9/2014 |
| WO | WO 2014134996 A1 | 9/2014 |
| WO | WO 2014182788 A2 | 11/2014 |
| WO | WO 2014182788 A3 | 11/2014 |
| WO | WO 2014197472 A1 | 12/2014 |
| WO | WO 2014209587 A1 | 12/2014 |
| WO | WO 2015038773 A1 | 3/2015 |
| WO | WO 2015097809 A1 | 7/2015 |
| WO | WO 2015161323 A1 | 10/2015 |
| WO | WO 2016024869 A1 | 2/2016 |
| WO | WO 2016048512 A1 | 3/2016 |
| WO | WO 2016187357 A1 | 11/2016 |

OTHER PUBLICATIONS

Energous Corp., IPRP, PCT/US2014/037170, Nov. 10, 2015, 8 pgs.
Energous Corp., ISRWO, PCT/US2014/041534, Oct. 13, 2014, 10 pgs.
Energous Corp., IPRP, PCT/US2014/041534, Dec. 29, 2015, 7 pgs.
Energous Corp., ISRWO, PCT/US2014/046956, Nov. 12, 2014, 10 pgs.
Energous Corp., IPRP, PCT/US2014/046956, Jan. 19, 2016, 7 pgs.
Energous Corp., ISRWO, PCT/US2014/037072, Sep. 12, 2014, 8 pgs.
Energous Corp., IPRP, PCT/US2014/037072, Nov. 10, 2015, 6 pgs.
Energous Corp., ISRWO, PCT/US2014/068568, Mar. 20, 2015, 10 pgs.
Energous Corp., IPRP, PCT/US2014/068568, Jun. 14, 2016, 8 pgs.
Energous Corp., ISRWO, PCT/US2014/055195, Dec. 22, 2014, 11 pgs.
Energous Corp., IPRP, PCT/US2014/055195, Mar. 22, 2016, 9 pgs.
Energous Corp., ISRWO, PCT/US2015/067291, Mar. 4, 2016, 10 pgs.
Energous Corp., IPRP, PCT/US2015/067291, Jul. 4, 2017, 4 pgs.
Energous Corp., ISRWO, PCT/US2015/067242, Mar. 16, 2016, 9 pgs.
Energous Corp., IPRP, PCT/US2015/067242, Jun. 27, 2017, 7 pgs.
Energous Corp., ISRWO, PCT/US2015/067243, Mar. 10, 2016, 11 pgs.
Energous Corp., IPRP, PCT/US2015/067243, Jun. 27, 2017, 7 pgs.
Energous Corp., ISRWO, PCT/US2014/037109, Apr. 8, 2016, 12 pgs.
Energous Corp., IPRP, PCT/US2014/037109, Apr. 12, 2016, 9 pgs.
Energous Corp., ISRWO, PCT/US2015/067275, Mar. 3, 2016, 8 pgs.
Energous Corp., IPRP, PCT/US2015/067275, Jul. 4, 2017, 7 pgs.
Energous Corp., ISRWO, PCT/US2015/067245, Mar. 17, 2016, 8 pgs.
Energous Corp., IPRP, PCT/US2015/067245, Jun. 27, 2017, 7 pgs.
Energous Corp., ISRWO, PCT/US2014/041546, Oct. 16, 2014, 12 pgs.
Energous Corp., IPRP, PCT/US2014/041546, Dec. 29, 2015, 9 pgs.
Energous Corp., ISRWO, PCT/US2015/67250, Mar. 30, 2016, 11 pgs.
Energous Corp., IPRP, PCT/US2015/67250, Mar. 30, 2016, 10 pgs.
Energous Corp., ISRWO, PCT/US2015/067325, Mar. 10, 2016, 9 pgs.
Energous Corp., IPRP, PCT/US2015/067325, Jul. 4, 2017, 8 pgs.
Energous Corp., ISRWO, PCT/US2014/040697, Oct. 1, 2014, 12 pgs.
Energous Corp., IPRP, PCT/US2014/040697, Dec. 8, 2015, 9 pgs.
Energous Corp., ISRWO, PCT/US2014/040705, Sep. 23, 2014, 8 pgs.
Energous Corp., IPRP, PCT/US2014/040705, Dec. 8, 2015, 6 pgs.
Energous Corp., ISRWO, PCT/US2015/067249, Mar. 29, 2016, 8 pgs.
Energous Corp., IPRP, PCT/US2015/067249, Jun. 27, 2017, 7 pgs.
Energous Corp., ISRWO, PCT/US2015/067246, May 11, 2016, 18 pgs.
Energous Corp., IPRP, PCT/US2015/067246, Jun. 27, 2017, 9 pgs.
Energous Corp., ISRWO, PCT/US2014/059317, Feb. 24, 2015, 13 pgs.
Energous Corp., IPRP, PCT/US2014/059317, Apr. 12, 2016, 10 pgs.
Energous Corp., ISRWO, PCT/US2014/049669, Nov. 13, 2014, 10 pgs.
Energous Corp., IPRP, PCT/US2014/049669, Feb. 9, 2016, 8 pgs.
Energous Corp., ISRWO, PCT/US2014/041323, Oct. 1, 2014, 10 pgs.
Energous Corp., IPRP, PCT/US2014/041323, Dec. 22, 2015, 8 pgs.

(56) References Cited

OTHER PUBLICATIONS

Energous Corp., ISRWO, PCT/US2014/048002, Nov. 13, 2014, 11 pgs.
Energous Corp., IPRP, PCT/US2014/048002, Feb. 12, 2015 8 pgs.
Energous Corp., ISRWO, PCT/US2014/062682, Feb. 12, 2015, 10 pgs.
Energous Corp., IPRP, PCT/US2014/062682, May 3, 2016, 8 pgs.
Energous Corp., ISRWO, PCT/US2014/049666, Nov. 10, 2014, 7 pgs.
Energous Corp., IPRP, PCT/US2014/049666, Feb. 9, 2016, 5 pgs.
Energous Corp., ISRWO, PCT/US2014/046961, Nov. 24, 2014, 16 pgs.
Energous Corp., IPRP, PCT/US2014/046961, Jan. 19, 2016, 8 pgs.
Energous Corp., ISRWO, PCT/US2015/067279, Mar. 11, 2015, 13 pgs.
Energous Corp., IPRP, PCT/US2015/067279, Jul. 4, 2017, 7 pgs.
Energous Corp., ISRWO, PCT/US2014/041342, Jan. 27, 2015, 10 pgs.
Energous Corp., IPRP, PCT/US2014/041342, Dec. 15, 2015, 8 pgs.
Energous Corp., ISRWO, PCT/US2014/046941, Nov. 6, 2014, 11 pgs.
Energous Corp., IPRP, PCT/US2014/046941, Jan. 19, 2016, 9 pgs.
Energous Corp., ISRWO, PCT/US2014/062661, Jan. 27, 2015, 12 pgs.
Energous Corp., IPRP, PCT/US2014/062661, May 3, 2016, 10 pgs.
Energous Corp., ISRWO, PCT/US2014/059871, Jan. 23, 2015, 12 pgs.
Energous Corp., IPRP, PCT/US2014/059871, Apr. 12, 2016, 9 pgs.
Energous Corp., ISRWO, PCT/US2014/045102, Oct. 28, 2014, 14 pgs.
Energous Corp., IPRP, PCT/US2014/045102, Jan. 12, 2016, 11 pgs.
Energous Corp., ISRWO, PCT/US2014/059340, Jan. 15, 2015, 13 pgs.
Energous Corp., IPRP, PCT/US2014/059340, Apr. 12, 2016, 11 pgs.
Energous Corp., ISRWO, PCT/US2015/067282, Jul. 5, 2016, 7 pgs.
Energous Corp., IPRP, PCT/US2015/067282, Jul. 4, 2017, 6 pgs.
Energous Corp., ISRWO, PCT/US2014/041558, Oct. 10, 2014, 8 pgs.
Energous Corp., IPRP, PCT/US2014/041558, Dec. 29, 2015, 6 pgs.
Energous Corp., ISRWO, PCT/US2014/045119, Oct. 13, 2014, 11 pgs.
Energous Corp., IPRP, PCT/US2014/045119, Jan. 12, 2016, 9 pgs.
Energous Corp., ISRWO PCT/US2014/045237, Oct. 13, 2014, 16 pgs.
Energous Corp., IPRP, PCT/US2014/045237, Jan. 12, 2016, 12 pgs.
Energous Corp., ISRWO, PCT/US2014/054897, Feb. 17, 2015, 10 pgs.
Energous Corp., IPRP, PCT/US2014/054897, Mar. 15, 2016, 8 pgs.
Energous Corp., ISRWO, PCT/US2015/067334, Mar. 3, 2016, 6 pgs.
Energous Corp., IPRP, PCT/US2015/067334, Jul. 4, 2017, 5 pgs.
Energous Corp., ISRWO, PCT/US2014/047963, Nov. 7, 2014, 13 pgs.
Energous Corp., IPRP, PCT/US2014/047963, Jan. 26, 2016, 10 pgs.
Energous Corp., ISRWO, PCT/US2014/054891, Dec. 18, 2014, 12 pgs.
Energous Corp., IPRP, PCT/US2014/054891, Mar. 15, 2016, 10 pgs.
Energous Corp., ISRWO, PCT/US2014/054953, Dec. 4, 2014, 7 pgs.
Energous Corp., IPRP, PCT/US2014/054953, Mar. 22, 2016, 5 pgs.
Energous Corp., ISRWO, PCT/US2015/067294, Mar. 29, 2016, 7 pgs.
Energous Corp., IPRP, PCT/US2015/067294, Jul. 4, 2017, 6 pgs.
Energous Corp., ISRWO, PCT/US2014/062672 Jan. 26, 2015, 11 pgs.
Energous Corp., IPRP, PCT/US2014/062672 May 10, 2016, 8 pgs.
Energous Corp., ISRWO, PCT/US2016/069313 Nov. 13, 2017, 10 pgs.
Energous Corp., IPRP, PCT/US2016/069313 Jul. 3, 2018, 7 pgs.
Energous Corp., ISRWO, PCT/US2014/044810 Oct. 21, 2014, 12 pgs.
Energous Corp., IPRP, PCT/US2014/044810, Jan. 5, 2016, 10 pgs.
Energous Corp., ISRWO, PCT/US2015/067271, Mar. 11, 2016, 6 pgs.
Energous Corp., IPRP, PCT/US2015/067271, Jul. 4, 2017, 5 pgs.
Energous Corp., ISRWO, PCT/US2014/040648, Oct. 10, 2014, 11 pgs.
Energous Corp., IPRP, PCT/US2014/040648, Dec. 8, 2015, 8 pgs.
Energous Corp., ISRWO, PCT/US2014/049673, Nov. 18, 2014, 10 pgs.
Energous Corp., IPRP, PCT/US2014/049673, Feb. 9, 2016, 6 pgs.
Energous Corp., ISRWO, PCT/US2014/068282, Mar. 19, 2015, 13 pgs.
Energous Corp., IPRP, PCT/US2014/068282, Jun. 7, 2016, 10 pgs.
Energous Corp., ISRWO, PCT/US2014/068586, Mar. 20, 2015, 11 pgs.
Energous Corp., IPRP, PCT/US2014/068586, Jun. 14, 2016, 8 pgs.
Energous Corp., ISRWO, PCT/US2016/068504, Mar. 30, 2017, 8 pgs.
Energous Corp., IPRP, PCT/US2016/068504, Jun. 26, 2018, 5 pgs.
Energous Corp., ISRWO, PCT/US2016/068495, Mar. 30, 2017, 9 pgs.
Energous Corp., IPRP, PCT/US2016/068495, Jun. 26, 2018, 7 pgs.
Energous Corp., ISRWO, PCT/US2015/067287, Feb. 2, 2016, 8 pgs.
Energous Corp., IPRP, PCT/US2015/067287, Jul. 4, 2017, 6 pgs.
Energous Corp., ISRWO, PCT/US2016/068551, Mar. 17, 2017, 8 pgs.
Energous Corp., IPRP, PCT/US2016/068551, Jun. 26, 2018, 6 pgs.
Energous Corp., ISRWO, PCT/US2016/068498, May 17, 2017, 8 pgs.
Energous Corp., IPRP, PCT/US2016/068498, Jun. 26, 2018, 6 pgs.
Energous Corp., ISRWO, PCT/US2016/068993, Mar. 13, 2017, 12 pgs.
Energous Corp., IPRP, PCT/US2016/068993, Jul. 3, 2018, 10 pgs.
Energous Corp., ISRWO, PCT/US2016/068565, Mar. 8, 2017, 11 pgs.
Energous Corp., IPRP, PCT/US2016/068565, Jun. 26, 2018, 9 pgs.
Energous Corp., ISRWO, PCT/US2016/068987, May 8, 2017, 10 pgs.
Energous Corp., IPRP, PCT/US2016/068987, Jul. 3, 2018, 7 pgs.
Energous Corp., ISRWO, PCT/US2016/069316 , Mar. 16, 2017, 15 pgs.
Energous Corp., IPRP, PCT/US2016/069316 , Jul. 3, 2018, 12 pgs.
Energous Corp., ISRWO, PCT/US2018/012806 , Mar. 23, 2018, 9 pgs.
Energous Corp., ISRWO, PCT/US2017/046800, Sep. 11, 2017, 13 pgs.
Energous Corp., IPRP, PCT/US2017/046800, Feb. 12, 2019, 10 pgs.
Energous Corp., ISRWO, PCT/US2017/065886, Apr. 6, 2018, 13 pgs.
Energous Corp., ISRWO, PCT/US2018/031768, Jul. 3, 2018, 9 pgs.
Order Granting Reexamination Request Control No. 90013793 Aug. 31, 2016, 23 pgs.
*Ossia Inc.* vs *Energous Corp.,* PGR2016-00023-Institution Decision, Nov. 29, 2016, 29 pgs.
*Ossia Inc.* vs *Energous Corp.,* PGR2016-00024-Institution Decision, Nov. 29, 2016, 50 pgs.
*Ossia Inc.* vs *Energous Corp.,* PGR2016-00024-Judgement-Adverse, Jan. 20, 2017, 3 pgs.
ReExam Ordered Control No. 90013793 Feb. 2, 2017, 8 pgs.
*Ossia Inc.* vs *Energous Corp.,* Declaration of Stephen B. Heppe in Support of Petition for Post-Grant Review of U.S. Pat. No. 9,124,125, PGR2016-00024, May 31, 2016, 122 pgs.
*Ossia Inc.* vs *Energous Corp.,* Petition for Post-Grant Review of U.S. Pat. No. 9,124,125, May 31, 2016, 92 pgs.
*Ossia Inc.* vs *Energous Corp.,* Patent Owner Preliminary Response, Sep. 8, 2016, 95 pgs.
*Ossia Inc.* vs *Energous Corp.,* Petition for Post Grant Review of U.S. Pat. No. 9,124,125, May 31, 2016, 86 pgs.

(56) References Cited

OTHER PUBLICATIONS

*Ossia Inc.* vs *Energous Corp.,* Declaration of Stephen B. Heppe in Support of Petition for Post-Grant Review of U.S. Pat. No. 9,124,125, PGR2016-00023, May 31, 2016, 144 pgs.
Supplementary European Search Report, EP Patent Application No. EP14818136-5, dated Jul. 21, 2016, 9 pgs.
European Search Report, EP Patent Application No. EP16189052.0, dated Jan. 31, 2017, 11 pgs.
European Search Report, EP Patent Application No. EP16189319-3, dated Feb. 1, 2017, 9 pgs.
European Search Report, EP Patent Application No. EP14822971, dated Feb. 1, 2017, 9 pgs.
European Search Report, EP Patent Application No. EP16189987, dated Feb. 1, 2017, 8 pgs.
European Search Report, EP Patent Application No. 16196205.5, dated Mar. 28, 2017, 7 pgs.
European Search Report, EP Patent Application No. 16189300, dated Feb. 28, 2017, 4 pgs.
European Search Report, EP Patent Application No. 16189988.5, dated Mar. 1, 2017, 4 pgs.
European Search Report, EP Patent Application No. 16189982.8, dated Jan. 27, 2017, 9 pgs.
European Search Report, EP Patent Application No. 16189974, dated Mar. 2, 2017, 5 pgs.
European Search Report, EP Patent Application No. 16193743, dated Feb. 2, 2017, 5 pgs.
European Search Report, EP Patent Application No. 14868901.1, dated Jul. 7, 2017, 5 pgs.
European Search Report. EP15876036, dated May 3, 2018, 8 pgs.
Supplemental European Search Report. EP15874273.4, dated May 11, 2018, 7 pgs.
Supplemental European Search Report. EP15876033.0, dated Jun. 13, 2018, 10 pgs.
Supplemental European Search Report. EP15876043.9, dated Aug. 8, 2018, 9 pgs.
Extended European Search Report. EP18204043.6, dated Feb. 14, 2019, 5 pgs.
L.H. Hsieh et al. Development of a Retrodirective Wireless Microwave Power Transmission System, IEEE, 2003 pp. 393-396.
B.D. Van Veen et al., Beamforming: A Versatile Approach to Spatial Filtering, IEEE, ASSP Magazine, Apr. 1988, pp. 4-24.
Leabman, Adaptive Band-partitioning for Interference Cancellation in Communication System, Thesis Massachusetts Institute of Technology, Feb. 1997, pp. 1-70.
Panda, SIW based Slot Array Antenna and Power Management Circuit for Wireless Energy Harvesting Applications, IEEE APSURSI, Jul. 2012, 2 pgs.
Singh, Wireless Power Transfer Using Metamaterial Bonded Microstrip Antenna for Smart Grid WSN: In Fourth International Conference on Advances in Computing and Communications (ICACC), Aug. 27-29, 2014, Abstract 299.
T. Gill et al. "A System for Change Detection and Human Recognition in Voxel Space using the Microsoft Kinect Sensor," 2011 IEEE Applied Imagery Pattern Recognition Workshop. 8 pgs.
J. Han et al. Enhanced Computer Vision with Microsoft Kinect Sensor: A Review, IEEE Transactions on Cybernetics vol. 43, No. 5. pp. 1318-1334. Oct. 3, 2013.
Zhai, "A Practical wireless charging system based on ultra-wideband retro-reflective beamforming" 2010 IEEE Antennas and Propagation Society International Symposium, Toronto, ON 2010, pp. 1-4.
Mao: BeamStar: An Edge-Based Approach to Routing in Wireless Sensors Networks, IEEE Transactions on Mobile Computing, IEEE Service Center, Los Alamitos, CA US, vol. 6, No. 11, Nov. 1, 2007, 13 pgs.
Smolders—Institute of Electrical 1-15 and Electronics Engineers: "Broadband microstrip array antennas" Digest of the Antennas and Propagation Society International Symposium. Seattle, WA Jun. 19-24, 1994. Abstract 3 pgs.
Paolo Nenzi et al; "U-Helix: On-chip short conical antenna", 2013 7th European Conference on Antennas and Propagation (EUCAP), ISBN:978-1-4673-2187-7, IEEE, Apr. 8, 2013, 5 pgs.
Adamiuk G et al; "Compact, Dual-Polarized UWB-Antanna, Embedded in a Dielectric" IEEE Transactions on Antenna and Propagation, IEEE Service Center, Piscataway, NJ, US vol. 56, No. 2, ISSN: 0018-926X, abstract; Figure 1, Feb. 1, 2010, 8 pgs.
Mascarenas et al.; "Experimental Studies of Using Wireless Energy Transmission for Powering Embedded Sensor Nodes." Nov. 28, 2009, Journal of Sound and Vibration, pp. 2421-2433.
Li et al. High-Efficiency Switching-Mode Charger System Design Considerations with Dynamic Power Path Management, Mar./Apr. 2012 Issue, 8 pgs.
Energous Corp., IPRP, PCT/US2018/012806, Jul. 9, 2019, 6 pgs.
Energous Corp., ISRWO, PCT/US2018/025465, Jun. 22, 2018, 9 pgs.
Energous Corp., IPRP, PCT/US2017/065886, Jun. 18, 2019, 10 pgs.
Energous Corp., ISRWO, PCT/US2018/039334, Sep. 11, 2018, 9 pgs.
Energous Corp., ISRWO, PCT/US2018/051082, Dec. 12, 2018, 12 pgs.
Energous Corp., ISRWO, PCT/US2018/064289, Mar. 28, 2019, 14 pgs.
Energous Corp., ISRWO, PCT/US2018/031786, Aug. 8, 2018, 9 pgs.
Energous Corp., ISRWO, PCT/US2019/021817, Apr. 6, 2019, 11 pgs.
Energous Corp., ISRWO, PCT/US2018/058178, Mar. 13, 2019, 10 pgs.
Energous Corp., ISRWO, PCT/US2019/015820, May 14, 2019, 9 pgs.
European Search Report, EP16882597-4, dated Aug. 7, 2019, 9 pgs.
Energous Corp., Supplementary European Search Report. EP 16880153.8, dated Jul. 2, 2019, 9 pgs.
Energous Corp., Supplementary European Search Report. EP17840412.5, dated Jul. 15, 2019, 8 pgs.
Energous Corp., Supplementary European Search Report. EP16880139-7, dated Jul. 12, 2019, 5 pgs.
Energous Corp., Supplementary European Search Report. EP16880158-7, dated Jul. 15, 2019, 8 pgs.
Energous Corp., Supplementary European Search Report. EP16882696-4, dated Jul. 3, 2019, 6 pgs.

\* cited by examiner

500

| 502 — Provide at least two antennas configured to direct electromagnetic waves toward a wireless power receiver such that the electromagnetic waves interfere constructively at a location proximate to the wireless power receiver |

↓

| 504 — Provide a housing structure configured to receive the at least two antennas |
| 506 — The housing structure includes:<br>(1) a metallic base;<br>(2) a first set of isolating components extending upwardly relative to the metallic base and defining a first region of the housing structure that is configured to receive a first antenna of the at least two antennas; and<br>(3) a second set of isolating components extending upwardly relative to the metallic base and defining a second region of the housing structure that is configured to receive a second antenna of the at least two antennas, the second set including at least some isolating components distinct from those in the first set. |
| 508 — The first and second sets of isolating components are configured (i) to create a physical gap in the housing structure between the first and second antennas and (ii) to reduce a mutual coupling between the first antenna and the second antenna |

↓

| 510 — Mount the first antenna at the first region of the housing structure |
| 512 — A first perimeter of the first antenna is surrounded by the first set of isolating components |

↓

| 514 — Mount the second antenna at the second region of the housing structure |
| 516 — A second perimeter of the second antenna is surrounded by the second set of isolating components |

↓

Figure 5A

DEVICES AND METHODS FOR REDUCING MUTUAL COUPLING EFFECTS IN WIRELESS POWER TRANSMISSION SYSTEMS

TECHNICAL FIELD

This application relates generally to wireless power transmission systems, including but not limited to, reducing mutual coupling effects in a wireless power transmission system.

BACKGROUND

Electronic devices, such as laptop computers, smartphones, portable gaming devices, tablets, and others, require power to operate. Electronic devices are often charged at least once a day, with high-use or power-hungry electronic devices requiring charging several times per day. Such activity may be tedious and present a burden to users. For example, a user may be required to carry chargers for each electronic device. In addition, users may have to find available power sources to connect to, which is inconvenient and time consuming. Lastly, some users must plug into a wall or some other power supply to be able to charge their electronic devices. Such activity may render electronic devices immobile and/or inoperable while charging.

Some conventional charging solutions include wireless charging stations, such as an inductive charging surface employing magnetic induction or resonating coils. Antennas may be combined or brought within close proximity on an array. However, coupling and interference increases as antennas are brought within close proximity to each other, thereby reducing the effectiveness of these conventional charging solutions.

Therefore, there is a need in the art to address the above-described drawbacks of far-field antennas and near-field antennas and create structures that reduce coupling and interfering effects among antennas.

SUMMARY

Accordingly, there is a need for systems and/or devices with more efficient, effective, and accurate methods for wireless charging. Such systems, devices, and methods optionally complement or replace conventional systems, devices, and methods for wireless charging. Systems, devices, and methods disclosed herein address the aforementioned issues and provide a number other benefits as well.

The disclosed embodiments include different structures which hold several antennas and create a gap between the antennas. In some embodiments, the gap is made up of a periodic wire medium. In some embodiments, the periodic wire medium reduces the mutual coupling between different antennas. The antennas are attached in an array in some embodiments. In some embodiments, several antennas are attached to a respective structure in a random pattern. In some embodiments, the periodic wire medium composes a plurality of isolating components.

In some embodiments, an apparatus includes a transmitter with a plurality of antennas. In some embodiments, the apparatus further includes a metallic base configured for receiving a plurality of antennas, the metallic base having a periodic wire medium along a perimeter of the metallic base and between each of the plurality of antennas, and the periodic wire medium extending upwardly from the metallic base, whereby a mutual coupling between each of the plurality of antennas is reduced by the periodic wire medium. In some embodiments, the transmitter transmits power wirelessly to a receiver.

In some embodiments, the antenna is attached to a printed circuit board (PCB) via a transmission line, which supplies a first current source, and the metallic structure provides a second current source to the periodic wire medium, where the second current source is different from the first current source. In some embodiments, the wire medium and/or the metallic structure supporting the wire medium is connected to a ground.

In some embodiments, the apparatus uses at least two of the antennas for wireless power transmission, and transmits such that the electromagnetic radiation from the two antennas creates constructive interference at a location of the receiver that receives the wireless power.

In some embodiments, a transmitter comprising a plurality of antennas is configured to wirelessly transmit power to a receiver. In some embodiments, a metallic base is configured to accommodate the plurality of antennas, the metallic base having a periodic wire medium along a perimeter of the metallic base and between each of the plurality of antennas, the periodic wire medium extending upwardly from the metallic base, whereby a mutual coupling between each of the plurality of antennas is reduced by the periodic wire medium.

In some embodiments, the periodic wire medium is formed using a plurality of isolating components. For example, in accordance with some embodiments, a transmitter device for a wireless charging system includes: (1) at least two antennas configured to direct electromagnetic waves toward a wireless power receiver such that the electromagnetic waves interfere constructively at a location proximate to the wireless power receiver; (2) a housing structure configured to receive the at least two antennas. In some embodiments, the housing structure includes: (a) a metallic base; (b) a first set of isolating components extending upwardly relative to the metallic base and defining a first region of the housing structure that is configured to receive a first antenna of the at least two antennas; and (c) a second set of isolating components extending upwardly relative to the metallic base and defining a second region of the housing structure that is configured to receive a second antenna of the at least two antennas, the second set including at least some isolating components distinct from those in the first set. In some embodiments, the first and second sets of isolating components are configured (i) to create a physical gap in the housing structure between the first and second antennas and (ii) to reduce a mutual coupling between the first antenna and the second antenna.

Thus, systems and devices are provided with more efficient and accurate methods for wirelessly transmitting power, thereby increasing the effectiveness, efficiency, and user satisfaction with such systems and devices. Such methods may complement or replace conventional methods for wirelessly transmitting power.

Note that the various embodiments described above can be combined with any other embodiments described herein. The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

BRIEF DESCRIPTION OF THE DRAWINGS

For a better understanding of the various described embodiments, reference should be made to the Detailed Description below, in conjunction with the following drawings in which like reference numerals refer to corresponding parts throughout the figures.

FIGS. 5A-5B are flowcharts illustrating a method of constructing a transmitter in accordance with some embodiments.

Figure 1:
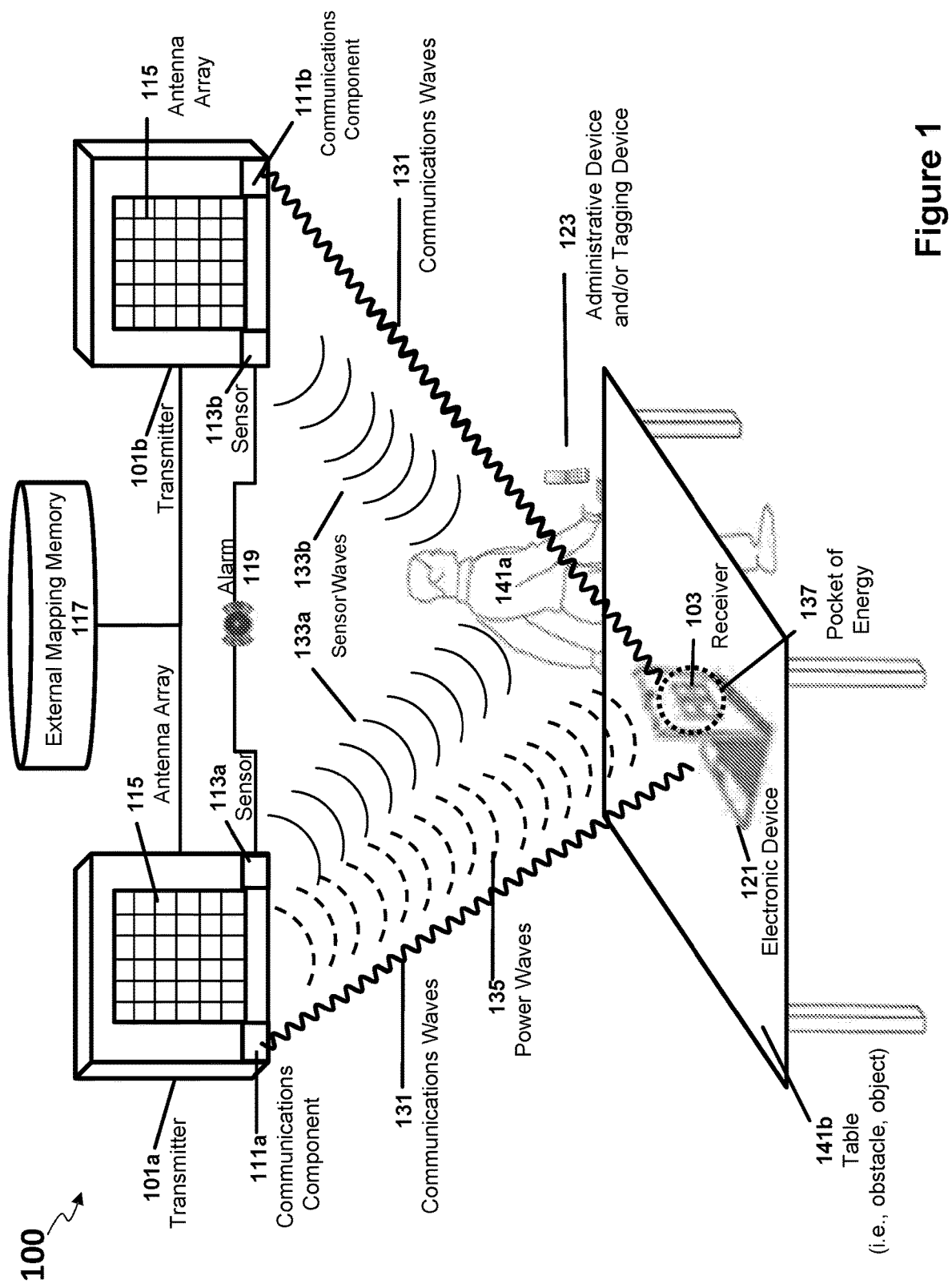
FIG. 1 illustrates components of a representative wireless power transmission system in accordance with some embodiments.

In accordance with common practice, the various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

DETAILED DESCRIPTION

Reference will now be made in detail to embodiments, examples of which are illustrated in the accompanying drawings. In the following detailed description, numerous specific details are set forth in order to provide a thorough understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

The embodiments of the present disclosure include different types of structures with distributed (e.g., periodic) wires or other separating materials surrounding antennas. In some instances, the distributed wires reduce mutual coupling between different antennas in an array attached to a structure. In some embodiments, a metallic structure is used with metal poles placed between each of several antennas, which are elevated from the bottom of the metallic structure. In some embodiments, the metallic structure is used to hold several antennas for wireless power transmission and/or reception.

Mutual coupling includes the electromagnetic interaction between antenna elements, which are in the same array or on nearby arrays. In some instances, current created for transmission, or received via electromagnetic transmission, is affected by mutual coupling from other antennas. In accordance with various embodiments, wires, poles, nails, and the like are used as isolating components to reduce the mutual coupling between the antennas. Similarly, in some embodiments, the elevation of different antennas is optimized for mutual coupling reduction as well as transmission/reception at certain frequencies and wavelengths. In various embodiments, the antennas include surface mount dielectric resonator antennas, microstrip antennas, and the like.

As used herein, a "transmitter" refers to a device (e.g., including a chip) that transmits, and optionally generates, electromagnetic wave(s), such as radio-frequency (RF) waves. In some embodiments, at least one RF wave is phase shifted and gain adjusted with respect to other RF waves, and substantially all of the waves pass through one or more antennas. In some embodiments, the waves are directed to a target receiver device. In some embodiments, the waves are broadcast to any electronic device in the vicinity of the transmitter. Example transmitters are described in greater detail below with reference to FIG. 2A.

In some embodiments, a receiver comprises an electronic device including at least one antenna, at least one rectifying circuit, and at least one power converter, which optionally utilizes a pocket of energy for powering or charging the electronic device. Example receivers are described in greater detail below with reference to FIG. 2B.

As used herein, "pocket-forming" refers to generating one or more RF waves that converge in a transmission field, forming controlled pocket of energy and null space in the transmission field. As used herein, a "pocket of energy" refers to an area or region of space where energy accumulates based on a convergence of waves that constructively interfere at that area or region. In some instances and embodiments, constructive interference occurs when the waves converge and their respective waveform characteristics coalesce, thereby augmenting the amount of energy concentrated at the particular location where the waves converge. As used herein, "null-space" refers to areas or regions of space where pockets of energy do not form, which may be caused by destructive interference of waves at that area or region. In some instances, destructive interference occurs when waves converge and their respective waveform characteristics are opposite of each other, thereby cancelling out the amount of energy concentrated at the particular location where the waves converge.

In some instances, a pocket of energy forms at locations of constructive interference patterns of power waves transmitted by the transmitter. In some instances and embodiments, the pockets of energy manifest as a three-dimensional field where energy may be harvested by receivers located within, or proximate to, the pockets of energy. In some embodiments, the pockets of energy produced by transmitters are harvested by a receiver, converted to an electrical charge, and then provided to an electronic device (e.g., laptop computer, smartphone, rechargeable battery) coupled to the receiver. In some embodiments, multiple transmitters and/or multiple receivers concurrently power various electronic devices. In some embodiments, the receiver is separable from the electronic device while in other embodiments, the receiver is integrated with the electronic device.

In some embodiments, transmitters perform adaptive pocket forming processes. In some embodiments, performing adaptive pocket forming processes includes adjusting transmission of the power waves in order to regulate power levels (e.g., based on data from one or more sensors). In some embodiments, the adaptive pocket forming processes adjust one or more characteristics used to transmit power waves (e.g., amplitude, frequency, phase, etc.) and/or reduce a power level (e.g., power density) of power waves transmitted to a given location. For example, in response to sensor readings that indicate a living being or sensitive object in proximity to a particular location or region in space, a transmitter, using an adaptive pocket-forming process, may reduce the power level of power waves converging at the location, thereby reducing or altogether eliminating the amount of energy at that location. In some embodiments, an adaptive pocket forming process uses destructive interference to diminish, reduce, or prevent the energy of power waves from concentrating at a particular location. For example, a transmitter may use destructive inference to diminish the energy concentrated at the location of an object, where the object is identified or tagged in a database to be excluded from receipt of power waves.

In some embodiments, the adaptive pocket forming transmitter uses a combination of the above techniques in response to data from one or more sensors. In some embodiments, the transmitter is coupled to sensors configured to detect presence and/or motion of objects. In some embodiments, the transmitter is coupled to sensors configured to recognize (e.g., via an image sensor) and/or identify particular objects (e.g., via RFID protocols). For example, a transmitter selectively reduces the power level of power waves at a particular location when data from one or more sensors indicates the presence and/or movement of a sensitive object, such as a human being, at or near the particular location so as to diminish or eliminate one or more pockets of energy at the particular location. In some embodiments, the transmitter terminates or adjusts the power waves when location data from sensors indicates arrival or anticipated arrival of a sensitive object within a predetermined distance (e.g., a distance within a range of 1-5 feet) of a particular location having one or more pockets of energy. In some embodiments, the transmitter reduces or terminates transmitting power waves to a particular location in accordance with a determination that a sensitive object is within the predetermined distance of the particular location or approaching the particular location.

In some embodiments, communications signals are produced by the receiver and/or the transmitter using an external power supply and a local oscillator chip. In some embodiments, the communication signals are produced using a piezoelectric material. In various embodiments, the communications signals are RF waves or any other communication medium or protocol capable of communicating data between processors, such as Bluetooth®, wireless fidelity (Wi-Fi), radio-frequency identification (RFID), infrared, near-field communication (NFC), ZigBee, and others. In some embodiments, such communications signals are used to convey information between the transmitter and the receiver. In some embodiments, the conveyed information is used to adjust the power waves. In some embodiments, the conveyed information includes one or more of information related to status, efficiency, user data, power consumption, billing, geo-location, and similar types of information.

Representative Wireless Charging System

FIG. 1 shows components of a representative wireless power transmission system 100. In accordance with some embodiments, the system 100 includes transmitters 101 (e.g., transmitters 101a and 101b), an external mapping memory 117, a receiver 103, and an electronic device 121 to be charged. In some embodiments, the transmitters 101 send various types of waves, such as communication signals 131, sensor waves 133, and power waves 135, into a transmission field. In some embodiments, the transmission field comprises a two or three-dimensional space into which the transmitters 101 direct the power waves 135.

In accordance with some embodiments, in operation the transmitters 101 transmit power transmission signals comprising the power waves 135, which are captured by the receivers 103. In some embodiments, the receivers 103 are configured to convert the energy of the power waves 135 into electrical energy for an electronic device 121 coupled to the receiver 103. In some embodiments, the receivers 103 comprise antennas, antenna elements, and other circuitry that converts the captured power waves 135 into a useable source of electrical energy on behalf of the electronic device(s) 121. In some embodiments, the antennas include metallic structures, which include distributed (e.g., periodically distributed) wires between different antenna elements. In some embodiments, the distributed wires reduce mutual coupling between the antennas. In some embodiments, the transmitters 101 intelligently transmit the power waves 135 into the transmission field by manipulating characteristics of the power waves 135 (e.g., phase, gain, direction, frequency) and/or by selecting a subset of the transmitter antennas 115 from which to transmit the power waves 135. In some embodiments, the transmitters 101 manipulate the characteristics of power waves 135 so that the trajectories of the power waves 135 cause the power waves 135 to converge at a predetermined location within the transmission field (e.g., a 3D location or region in space), resulting in constructive or destructive interference at the location.

In some embodiments, constructive interference is generated at the convergence of the power waves 135 at the particular location within the transmission field for the one or more transmitters 101. Constructive interference occurs when the power waves 135 converge and their respective waveform characteristics coalesce, thereby augmenting the amount of energy concentrated at the convergence location. In some embodiments, the constructive interference resulting from the power waves 135 having particular waveform characteristics generates a pocket of energy 137 at the particular location in the transmission field where the power waves 135 converge.

In some embodiments, destructive interference is generated at the convergence of the power waves 135 at a particular location within the transmission field for the one or more transmitters 101. Destructive interference occurs when the power waves 135 converge at particular location and their respective waveform characteristics are opposite each other (e.g., the waveforms cancel each other out), thereby diminishing the amount of energy concentrated at the particular location. Where constructive interference may result in generating pockets of energy when enough energy is present, destructive interference may result in generating a negligible amount of energy or null at the particular location within the transmission field.

In some embodiments, the transmitters 101 comprise, or are coupled to, one or more of: a processor (not shown), a communications component 111, a sensor 113, and an antenna array 115. In some embodiments, the antenna array 115 includes one or more metallic structures with distributed wires (also referred to herein as isolating components and/or periodic wire mediums) that separate the antennas in the array such that mutual coupling between antennas is reduced. In various embodiments, the processor(s) control, manage, and otherwise govern the various processes, functions, and components of the transmitters 101. In some embodiments, the transmitters 101 comprise an internal mapping memory (not shown). In other embodiments, the transmitters 101 are wired or wirelessly coupled to an external mapping memory 117.

In some embodiments, the transmitters 101 comprise one or more transmitter processors configured to process and communicate various types of data (e.g., heat-mapping data, sensor data, and the like). In some embodiments, a transmitter processor of a transmitter 101 manages execution of various processes and functions of the transmitter, and manages the components of the transmitter 101. For example, in accordance with some embodiments, the transmitter processor determines an interval at which a beacon signal should be broadcast by a communications component 111 to identify the receivers 103 that inhabit the transmission field. As another example, the processor generates heat-mapping data from the communications signals 131 received by the communications component 111, and then, based upon sensor data received from a sensor 113 or sensor processor, the transmitter processor determines the safest and most effective characteristics for the power waves 135. In some embodiments, a single transmitter 101 includes a single transmitter processor. In some embodiments, a single transmitter processor controls and/or governs multiple of the transmitters 101. For example, in accordance with some embodiments, the transmitters 101 are coupled to a server computer (not shown) comprising a server processor that executes software modules instructing the server processor to control and/or govern the behavior of the various transmitters 101. In some embodiments, a single transmitter 101 comprises multiple processors configured to execute or control specified aspects of the transmitter's 101 behavior and components. For example, in accordance with some embodiments, the transmitter 101 comprises a transmitter processor and a sensor processor, where the sensor processor is configured to manage a sensor 113 and generate sensor data, and where the transmitter processor is configured to manage the remaining functions of the transmitter 101.

It should be appreciated that the system 100 optionally comprises any number of transmitters 101, such as a first transmitter 101*a* and a second transmitter 101*b*, each of which transmits waves (e.g., waves 131, 133, 135) into one or more transmission fields. As such, the system 100 optionally comprises multiple discrete transmission fields associated with the transmitters 101. In some embodiments, the transmission fields overlap, while in other embodiments the transmission fields do not overlap. In some embodiments, the transmission fields are managed discretely by the transmitter processor(s). In some embodiments, the system 100 comprises multiple transmission fields (e.g., overlapping and/or non-overlapping fields) that are managed by the transmitter processor(s) as a unitary transmission field.

In some embodiments, the communications components 111 effectuate wired and/or wireless communications to and from the receivers 103 of the system 100. In some embodiments, a communications component 111 is an embedded component of a transmitter 101. In some embodiments, the communications component 111 is coupled to the transmitter 101 via a wired and/or wireless communications medium. In some embodiments, the communications component 111 is shared among a plurality of the transmitters 101. In some embodiments, each of the transmitters 101 coupled to the communications component 111 uses data within a communications signal 131 received by the communications component 111.

In some embodiments, the communications component 111 comprises one or more electromechanical components (e.g., processor, antenna) that enable the communications component 111 to communicate various types of data with one or more of the receivers 103, other transmitters 101 of the system 100, and/or other components of a transmitter 101. In some embodiments, communications signals 131 represent a distinct channel for hosting communications, independent from the power waves 135 and/or the sensor waves 133. In some embodiments, the data is communicated using communications signals 131, using one or more wired or wireless protocols and associated hardware and software technology. In some embodiments, the communications component 111 operates based on any number of communication protocols, such as Bluetooth®, Wireless Fidelity (Wi-Fi), Near-Field Communications (NFC), ZigBee, and others. It should be appreciated that the communications component 111 is not limited to radio-frequency based technologies, but optionally include radar, infrared, and/or sound devices for sonic triangulation of the receiver 103.

In some embodiments, the data contained within the communications signals 131 is used by the wireless-charging devices 101, 103 to determine how the transmitter 101 may transmit safe and effective power waves 135 that generate a pocket of energy 137 from which the receiver 103 may capture energy and convert it to useable alternating current (AC) or direct current (DC) electricity. In some embodiments, using a communications signal 135, the transmitter 101 communicates data to: (1) identify receivers 103 within a transmission field; (2) determine whether electronic devices 121 or users are authorized to receive wireless charging services from the system 100; (3) determine safe and effective waveform characteristics for power waves 135; and/or (4) hone the placement of pockets of energy 137 (among other possible functions). Similarly, in some embodiments, a communications component (not shown) of a receiver 103 uses a communications signal 135 to communicate data used to: (1) alert transmitters 101 that the receiver 103 has entered or is about to enter a transmission field; (2) provide information about the user or the electronic device 121 being charged by the receiver 103; (3) indicate the effectiveness of the power waves 135; and/or (4) provide updated transmission parameters that the transmitters 101 may use to adjust the power waves 135 (as well as other types of useful data). As an example, the communications component 111 of the transmitter 101 communicates (e.g., sends and/or receives) different types of data (e.g., authentication data, heat-mapping data, and transmission parameters) containing various types of information. Non-limiting examples of the information include a beacon message, a transmitter identifier (TX ID), a device identifier (device ID) for an electronic device 121, a user identifier (user ID), a battery level for the device 121, a receiver's 103 location in the transmission field, the device's 121 location in the transmission field, and/or other such information.

In some embodiments, the sensors 113 are physically associated with (e.g., connected to, or a component of) the transmitters 101. In some embodiments, the sensors 113 are communicatively coupled to the transmitters 101. In some embodiments, the sensors 113 are configured to detect and/or identify various conditions of the system 100 and/or the transmission field(s). In some embodiments, sensor data is generated by the sensor(s) 113 for the transmitter 101. In some embodiments, the transmitter(s) 101 generate and/or transmit the power waves 135 based on the sensor data. In some embodiments, the sensor data is utilized by the transmitters 101 to determine various modes of operation and/or how to appropriately generate and transmit power waves 135, so that the transmitters 101 may provide safe, reliable, and efficient wireless power to the receivers 103. In some embodiments, the sensors 113 transmit sensor data collected during sensor operations to a transmitter processor for subsequent processing. In some embodiments, one or more sensor processors are coupled to or housed within the sensors 113. In some embodiments, the sensor processor(s) comprise a microprocessor that executes various data processing routines, such that the sensor data received at the transmitter processor is partially or completely pre-processed as useable mapping data for generating the power waves 135.

In some embodiments, the sensors 113 transmit sensor data to the transmitter(s) 101. Although described in some embodiments as raw sensor data, the sensor data is not limited to raw sensor data and optionally includes processed data (e.g., processed by a sensor processor, a receiver processor, a transmitter processor, or any other processor). In some embodiments, the raw sensor data includes information derived from the sensor, and processed sensor data includes determinations based upon the raw sensor data. For example, in accordance with some embodiments, a gyroscope of a receiver provides raw data such as an orientation in X-plane, Y-plane, and Z-planes, and processed sensor data from the gyroscope includes a determination as to positioning (e.g., location and/or orientation) of the receiver or of a receiver antenna based upon the orientation of the receiver. In another example, raw sensor data from an infrared sensor of a receiver provides thermal imaging information, and processed sensor data includes an identification of the person 141a based upon the thermal imaging information.

As used herein, sensor data optionally include data processed at the sensor or other device. In some embodiments, a gyroscope and/or an accelerometer of the receiver 103, or an electronic device associated with the receiver 103, provides sensor data indicating positioning (e.g., orientation) of the receiver 103 or the electronic device 121. In some embodiments, the transmitter 101 uses the positioning information to determine whether and/or how to transmit the power waves 135 to the receiver 103. For example, the receiver 103 is embedded or attached to an electronic device 121 (e.g., a smartphone, tablet, laptop, or the like) comprising a gyroscope and/or an accelerometer that generates sensor data indicating an orientation of the electronic device 121. In some embodiments, the receiver 103 transmits the sensor data to the transmitter(s) 101 via the communications waves 131. In some embodiments, the transmitter 101 transmits the power waves 135 to the location of the receiver 103 until the transmitter 101 receives, via communications waves 131, sensor data (e.g., produced by the gyroscope and/or accelerometer) indicating that the receiver 103 (or the electronic device) is in motion, or has a positioning suggesting that the electronic device 121 is in use or nearby a person 141a. As an example, in accordance with some embodiments, a receiver 103 is attached to, or embedded within, a smartphone comprising a gyroscope and an accelerometer. In this example, while the smartphone is flat on a table 141b, the transmitter(s) 101 transmit the power waves 135 to the smartphone. When the person 141a lifts the smartphone to his or her head, the accelerometer generates sensor data indicating that the smartphone is in motion and the gyroscope generates sensor data indicating that the smartphone has a planar-orientation indicating that the smartphone is against the person's 141a ear. Accordingly, the transmitter(s) 101 then determine from this sensor data produced by the gyroscope and accelerometer that the smartphone is against the person's 141a head, and the transmitter(s) 101 cease to direct the power waves 131 to the receiver 103 of the smartphone. In some embodiments, the transmitter(s) 101 make this determination in accordance with one or more preset criteria for data produced by gyroscopes and/or accelerometers, such as preset threshold values for acceleration, velocity, location, and/or orientation.

In some embodiments, the sensors 113 comprise devices configured to emit the sensor waves 133, which are optionally any type of wave that capable of being used to identify sensitive objects 141 in a transmission field, such as a person 141 or a piece of furniture. Non-limiting examples of sensor technologies for the sensors 113 include: infrared/pyroelectric, ultrasonic, laser, optical, Doppler, accelerometer, microwave, millimeter, and RF standing-wave sensors. Other sensor technologies optionally used for the sensors 113 include resonant LC sensors, capacitive sensors, and inductive sensors. In some embodiments, a sensor 113 generates sensor data based upon a particular type of sensor waves 133 used and/or particular protocols associated with the sensor waves 133. In some embodiments, the sensor 113 comprises a sensor processor that receives, interprets, and/or processes sensor data, which the sensor 113 then provides to a remote device, such as a transmitter processor.

In various embodiments, the sensors 113 comprise passive sensors, active sensors, and/or smart sensors. In some instances and embodiments, passive sensors, such as tuned LC sensors (resonant, capacitive, or inductive), comprise a simple type of sensor 113 and provide minimal but efficient object discrimination. In some embodiments, passive sensors are used as secondary sensors (also sometimes called remote sensors). In some embodiments, the secondary sensors are dispersed into the transmission field. In some embodiments, the secondary sensor(s) are a component of a receiver 103. In some embodiments, a secondary sensor is distinct from, and remote from, the transmitter(s) 101 and the receiver(s) 103. In some embodiments, the secondary sensor(s) independently capture raw sensor data that is communicated a sensor processor (e.g., communicated via a wireless or wired connection).

In some instances and embodiments, active sensors, such as infrared (IR) or pyro-electric sensors, provide efficient and effective target discrimination. In some embodiments, the active sensors have minimal processing associated with sensor data produced by the active sensors. In some embodiments, the active sensor(s) are dispersed into the transmission field. In some embodiments, the active sensor(s) are a component of a receiver 103. In some embodiments, an active sensor is distinct from, and remote from, the transmitter(s) 101 and the receiver(s) 103.

In some embodiments, smart sensors are sensors 113 having on-board digital signal processing (DSP) configured to process or pre-process raw sensor data (e.g., prior to transmitting the sensor data to a transmitter processor). In some instances and embodiments, the smart sensors are capable of fine, granular object discrimination and provide transmitter processors with pre-processed sensor data that is more efficiently handled by the transmitter processor (e.g., when determining how to generate and/or transmit the power waves 135).

In some embodiments, the sensors 113 have the capability to operate and generate different types of sensor data (e.g., positioning data, velocity data, temperature data, imaging data, and the like). In some embodiments, the sensors 113 generate location-related information in various formats.

In accordance with some embodiments, active and smart sensors are categorized by sensor type, characteristic hardware and software requirements, and capabilities for distance calculation and motion detection. As a non-limiting example, Table 1 illustrates a representative categorization:

TABLE 1

Example Active and Smart Sensor Categorizations
Active and Smart Sensors

| Sensor Type | Hardware Requirements | Software Requirements | Distance Calculation | Motion Detection |
|---|---|---|---|---|
| One dimensional | Simple circuits | Minimal | Rough | None |
| Smart one dimensional | Simple circuits | Limited | Good | None |
| Two dimensional (2D) | Simple circuits | Limited | Good | Limited |
| Smart two dimensional | Complex circuits | Moderate | Good | Limited |
| Three dimensional (3D) | Complex circuits | Intensive | Good | Good |
| Smart three dimensional | DSP (primary processing) | Intensive | Precise | Excellent |

In some embodiments, the sensors 113 are configured for human recognition, and thus differentiate a person 141a from other objects, such as furniture 141b. Non-limiting examples of sensor data processed by human recognition-enabled sensors 113 may include: body temperature data, infrared range-finder data, motion data, activity recognition data, silhouette detection and recognition data, gesture data, heart rate data, portable devices data, and wearable device data (e.g., biometric readings and output, accelerometer data).

In some embodiments, the control systems of the transmitter(s) 101 adhere to electromagnetic field (EMF) exposure protection standards for human subjects. Maximum exposure limits are defined by US and European standards in terms of power density limits and electric field limits (as well as magnetic field limits). These include, for example, limits established by the Federal Communications Commission (FCC) for MPE, and limits established by European regulators for radiation exposure. Limits established by the FCC for MPE are codified at 47 CFR § 1.1310. For electromagnetic field (EMF) frequencies in the microwave range, power density can be used to express an intensity of exposure. Power density is defined as power per unit area. For example, power density can be commonly expressed in terms of watts per square meter ($W/m^2$), milliwatts per square centimeter ($mW/cm^2$), or microwatts per square centimeter ($\mu W/cm^2$).

In some embodiments, the present methods for wireless power transmission incorporate various safety techniques to ensure that human occupants 141a in or near a transmission field are not exposed to EMF energy near or above regulatory limits, or other nominal limits. In some embodiments, a margin of error (e.g., about 10% to 20%) beyond the nominal limits is included, so that human subjects are not exposed to power levels at or near the EMF exposure limits. In some embodiments, the system 100 implements staged protection measures, such as reduction or termination of wireless power transmission if humans 141a (and in some embodiments, other living beings and/or sensitive objects) move toward a pocket of energy 137 with power density levels exceeding EMF exposure limits. In some embodiments, the system 100 includes redundant safety systems, such as use of power reduction routines together with alarm(s) 119.

In some embodiments, the sensor(s) 113 detect whether objects, such as person 141 or furniture, enter a predetermined proximity to a transmitter 101, power waves 135, and/or a pocket of energy 137. In some embodiments, the sensor(s) 113 notify a transmitter 101 or other components of the system 100 of the presence of the detected objects. In some embodiments, the sensor(s) 113 instruct the transmitter 101 or other components of the system 100 to execute various actions based upon the detected objects. In some embodiments, the sensor(s) 113 transmit sensor data to the transmitter(s) 101, and the transmitter 101 determine which actions to execute (e.g., adjust a pocket of energy, cease power wave transmission, reduce power wave transmission). For example, in accordance with a sensor 113 determining that a person 141 has entered the transmission field, and that the person 141 is within a predetermined proximity of the transmitter 101, the sensor provides the relevant sensor data to the transmitter(s) 101. In this example, in response to receiving the relevant sensor data, the transmitter(s) 101 reduce or terminate transmission of the power waves 135. As another example, after identifying the person 141 entering the transmission field and determining that the person 141 has come within the predetermined proximity of a pocket of energy 137, the sensor(s) 113 provide sensor data to the transmitter(s) 101 indicating such. In this example, in response to receiving the sensor data, the transmitter(s) 101 adjust the characteristics of the power waves 135 to diminish the amount of energy concentrated at the pockets of energy 137, to generate a null, and/or to reposition the location of the pocket energy 137. In another example, the system 100 includes alarm device(s) 119 configure to produce a warning and/or generate and transmit a digital message (e.g., to a system log, administrative computing device configured to administer the system 100, and/or a user device). In this example, in accordance with the sensor(s) 113 detecting an unsafe or prohibited condition of system 100 (e.g., a person 141 entering a predetermined proximity of a transmitter 101, power wave(s) 135, and/or a pocket of energy 137), a signal (e.g., comprising sensor data) is transmitted to the alarm device(s) 119. In this example, the alarm device(s) activate a warning and/or generate and transmit a notification (e.g., to an administrator device or user device). In various embodiments, a warning produced by the alarm 119 comprises sensory feedback, such as audio feedback, visual feedback, haptic feedback, or some combination thereof.

In some embodiments, as illustrated in FIG. 1, a sensor 113 is a component of a transmitter 101, housed within the transmitter 101. In some embodiments, a sensor 113 is external to the transmitter 101 and communicates, over a wired or wireless connection, sensor data to one or more transmitters 101. In some embodiments, a sensor 113 provides sensor data to the one or more transmitters 101. In some embodiments, the processors of the transmitters 101 then share this sensor data to determine the appropriate formulation and transmission of power waves 135. In some embodiments, multiple sensors 113 share sensor data with multiple transmitters 101. In some embodiments, sensors 113 or host transmitters 101 send and receive sensor data with other sensors 113 or host transmitters in the system 100. In some embodiments, the sensors 113 or the host transmitters 101 transmit or retrieve sensor data with one or more mapping memories 117.

As an example, in accordance with some embodiments, a first transmitter 101a comprises a first sensor 113a that emits sensor waves 133a and generates sensor data. In some embodiments, the sensor data is stored on the first transmitter 101a and/or a mapping memory 117. In this example, the system 100 includes a second transmitter 101b comprising a second sensor 113b that emits sensor waves 133b and generates corresponding sensor data. In some embodiments, the sensor data from the second sensor 113b is stored on the second transmitter 101b and/or a mapping memory 117 of the system 100. In this example, in accordance with some embodiments, both of the transmitters 101a, 101b comprise processors that receive sensor data from the sensors 113a, 113b, and/or fetch stored sensor data from the particular storage locations. In some embodiments, the sensor data produced by the respective sensors 113a, 113b is shared amongst the respective transmitters 101a, 101b. In some embodiments, the processors of each of the transmitters 101a, 101b is use the shared sensor data and to determine the characteristics for generating and transmitting power waves 133a, 133b based on the shared sensor data. In some embodiments, the processors determine whether to transmit power waves 133a, 133b based on whether a sensitive object 141 is detected.

In some embodiments, a transmitter 101 comprises, or is coupled to, multiple sensors 113 from which the transmitter 101 receives sensor data. As an example, a single transmitter 101 comprises a first sensor located at a first position on the transmitter 101 and a second sensor located at a second position on the transmitter 101. In this example, the sensors 113 are binary sensors that may acquire stereoscopic sensor data, such as the relative location of a sensitive object 141 to the sensors 113. In some embodiments, such binary or stereoscopic sensors are configured to provide three-dimensional imaging capabilities, which are transmitted to an administrator's workstation or other computing device. In some instances, binary and stereoscopic sensors improve the accuracy of location detection and displacement (e.g., of receiver 103 or object 141), which is beneficial, for example, in motion recognition and tracking.

In some embodiments, the transmitters 101 comprise an antenna array 115. In some embodiments, the antenna array 115 includes a set of one or more antennas configured to transmit one or more types of waves 131, 133, 135. In some embodiments, an antenna array 115 comprises antenna elements, which are configurable tiles comprising an antenna. In some embodiments, the antenna array 115 includes one or more integrated circuits controlling the behavior of an antenna within the antenna array 115, such as generating power waves 135 having predetermined characteristics (e.g., amplitude, frequency, trajectory, phase). In some embodiments, the antenna array 115 includes one or more metallic (or other conductive) structures configured to reduce mutual coupling between antennas. In some embodiments, the conductive structures include distributed (e.g., periodic) isolating components, such as wires, poles, or the like. In some embodiments, the distributed isolating components separate and surround each of the antennas such that mutual coupling between the antennas is reduced. In some instances and embodiments, an antenna of the antenna array 115 transmits a series of power waves 135 having predetermined characteristics, such that a series of power waves 135 arrive at a given location within the transmission field, and exhibit those characteristics. In some embodiments, the antennas of the antenna array 115 transmit power waves 135 that intersect at the given location (e.g., the location where a receiver 103 is detected), and due to their respective characteristics, form a pocket of energy 137, from which the receiver 103 collects energy and generates electricity. It should be appreciated that, although the system 100 is described as utilizing radio-frequency based power waves 135, additional or alternative transmitter antennas, antenna arrays, and/or wave-based technologies are optionally used (e.g., ultrasonic, infrared, magnetic resonance) to wirelessly transmit power from the transmitter 101 to the receiver 103.

In some embodiments, a transmitter 101 splits the antenna array 115 into groups of antennas, such that the constituent antenna groups perform different tasks. For example, in an antenna array 115 comprising ten antennas, nine antennas are configured to transmit power waves 135 that form a pocket of energy 137 at a receiver 103, and a tenth antenna is configured to operate in conjunction with the communications component 111 to identify new receivers (not shown) in the transmission field. In some embodiments, an antenna identifies new receivers by continuously and sequentially transmitting low levels of energy to discrete locations within the transmission field. In some embodiments, the antenna utilizes responses to the low levels of energy, along with a communications signal 131, to determine a new receiver's location relative to the transmitter 101 within the transmission field. In another example, an antenna array 115 has ten antennas split into two groups of five, each of which is configured to transmit power waves 135 toward a respective receiver 103 in the transmission field.

In some embodiments, the receiver(s) 103 are used for powering or charging an associated electronic device 121. In some embodiments, the associated electronic device 121 is coupled to or integrated with one or more of the receivers 103. In some embodiments, a receiver 103 comprises one or more antennas (not shown) that receive power waves 135 originating from one or more transmitters 101. In some embodiments, the receiver(s) 103 receive one or more power waves 135 produced by and transmitted from the transmitter 101. In some embodiments, the receiver 103 harvests power waves 135 from one or more pockets of energy 137. In some embodiments, the one or more pockets of energy 137 include a three-dimensional field in space resulting from the convergence of a plurality of power waves 135 produced by one or more transmitters 101.

In some embodiments, the receiver 103 comprises an array of antennas configured to receive power waves 135. In some embodiments, the receiver 103 antennas harvest energy from one or more power waves 135 and/or from a pocket of energy 137 formed from an accumulation of power waves 135 at a particular location within a transmission field. In some embodiments, after the power waves 135 are received and/or energy is gathered from a pocket of energy 137, conversion circuitry (e.g., integrated circuits, amplifiers, rectifiers, voltage conditioner) of the receiver 103 converts the energy of the power waves 135 (e.g., radio frequency electromagnetic radiation) to electrical energy (e.g., electricity). In some embodiments, the electrical energy is stored in an energy storage device (e.g., a battery, a capacitor, and/or an inductor) and/or used by an electronic device 121. In some embodiments, a rectifier of the receiver 103 translates the electrical energy from an AC form to a DC form usable by the electronic device 121. In some embodiments, other types of conditioning are applied to the electrical energy. For example, in accordance with some embodiments, a voltage conditioning circuit is used to increase or decrease the voltage of the electrical energy as required by the electronic device 121. In some embodiments an electrical relay is used to convey the electrical energy from the receiver 103 to the electronic device 121.

Figure 2A:
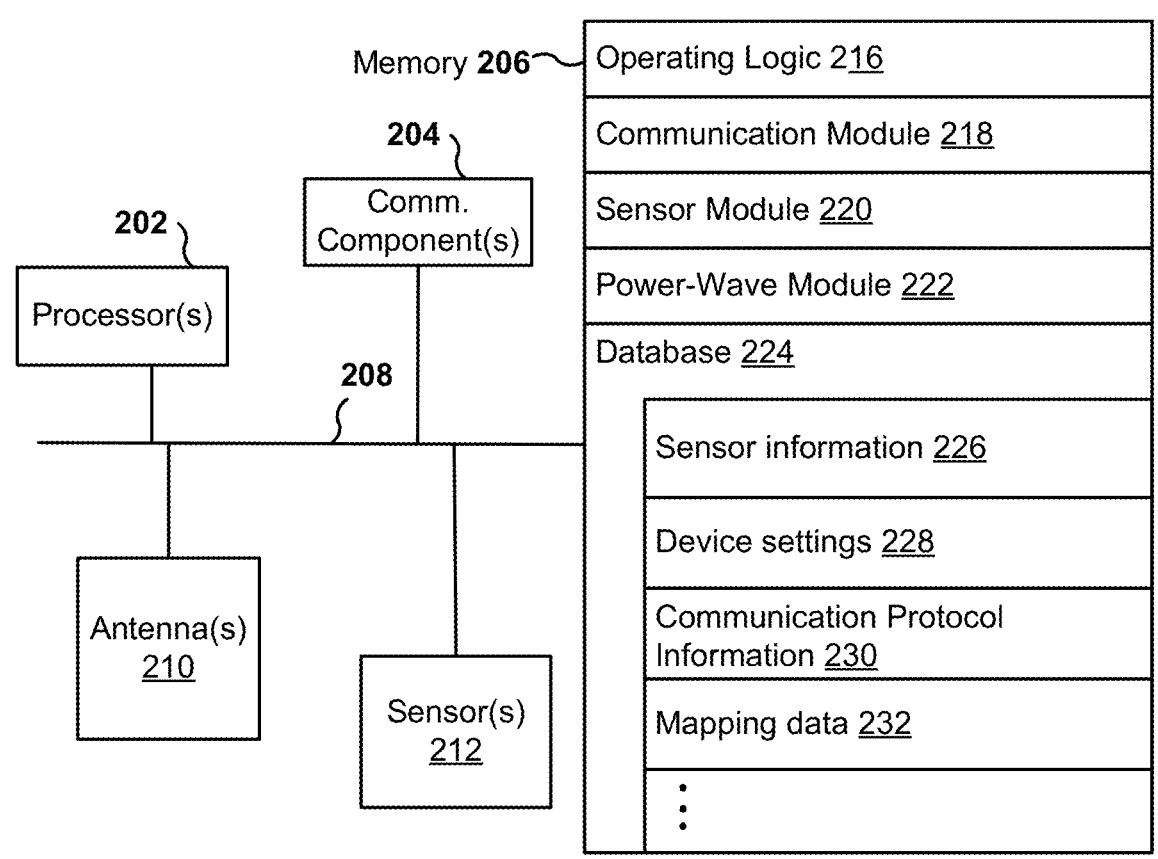
FIG. 2A is a block diagram illustrating a representative transmitter device in accordance with some embodiments.

FIG. 2A is a block diagram illustrating a representative transmitter device 101 (also sometimes referred to herein as a transmitter) in accordance with some embodiments. In some embodiments, the transmitter device 101 includes one or more processing units (e.g., CPUs, ASICs, FPGAs, microprocessors, and the like) 202, one or more communication components 204, memory 206, antenna(s) 210, and one or more communication buses 208 for interconnecting these components (sometimes called a chipset). In some embodiments, the transmitter device 101 includes one or more sensor(s) 212 such as one or sensors 113 described above with reference to FIG. 1. In some embodiments, the transmitter device 101 includes one or more output devices such as one or more indicator lights, a sound card, a speaker, a small display for displaying textual information and error codes, etc. In some embodiments, the transmitter device 101 includes a location detection device, such as a GPS (global positioning satellite) or other geo-location receiver, for determining the location of the transmitter device 101.

In some embodiments, the antenna(s) 210 include one or more surface-mounted dielectric resonator antenna(s), surface-mounted dielectric resonator antenna(s) with a hollowed core, and/or microstrip antenna(s). In some embodiments, the antenna(s) 210 are included in a housing structure, and the housing structure includes sets of isolating components that each define regions within the housing structure (also referred to herein as coupling locations) at which a respective antenna is placed. Additional details regarding example housing structures and example isolating components are provided below in reference to FIGS. 3 and 4A-4B.

In various embodiments, the one or more sensor(s) 212 include one or more thermal radiation sensors, ambient temperature sensors, humidity sensors, IR sensors, occupancy sensors (e.g., RFID sensors), ambient light sensors, motion detectors, accelerometers, and/or gyroscopes.

The communication component(s) 204 enable communication between the transmitter 101 and one or more communication networks. In some embodiments, the communication component(s) 204 are capable of data communications using any of a variety of custom or standard wireless protocols (e.g., IEEE 802.15.4, Wi-Fi, ZigBee, 6LoWPAN, Thread, Z-Wave, Bluetooth Smart, ISA100.11a, WirelessHART, MiWi, etc.) custom or standard wired protocols (e.g., Ethernet, HomePlug, etc.), and/or any other suitable communication protocol, including communication protocols not yet developed as of the filing date of this document.

The communication component(s) 204 include, for example, hardware capable of data communications using any of a variety of custom or standard wireless protocols (e.g., IEEE 802.15.4, Wi-Fi, ZigBee, 6LoWPAN, Thread, Z-Wave, Bluetooth Smart, ISA100.11a, WirelessHART, MiWi, etc.) and/or any of a variety of custom or standard wired protocols (e.g., Ethernet, HomePlug, etc.), or any other suitable communication protocol, including communication protocols not yet developed as of the filing date of this document.

The memory 206 includes high-speed random access memory, such as DRAM, SRAM, DDR SRAM, or other random access solid state memory devices; and, optionally, includes non-volatile memory, such as one or more magnetic disk storage devices, one or more optical disk storage devices, one or more flash memory devices, or one or more other non-volatile solid state storage devices. The memory 206, or alternatively the non-volatile memory within memory 206, includes a non-transitory computer-readable storage medium. In some embodiments, the memory 206, or the non-transitory computer-readable storage medium of the memory 206, stores the following programs, modules, and data structures, or a subset or superset thereof:

Operating logic 216 including procedures for handling various basic system services and for performing hardware dependent tasks;

Communication module 218 for coupling to and/or communicating with remote devices (e.g., remote sensors, transmitters, receivers, servers, mapping memories, etc.) in conjunction with communication component(s) 204;

Sensor module 220 for obtaining and processing sensor data (e.g., in conjunction with sensor(s) 212) to, for example, determine the presence, velocity, and/or positioning of object in the vicinity of the transmitter 101;

Power-wave generating module 222 for generating and transmitting (e.g., in conjunction with antenna(s) 210) power waves, including but not limited to, forming pocket(s) of energy at given locations; and Database 224, including but not limited to:
Sensor information 226 for storing and managing data received, detected, and/or transmitted by one or more sensors (e.g., sensors 212 and/or one or more remote sensors);

Device settings 228 for storing operational settings for the transmitter 101 and/or one or more remote devices;

Communication protocol information 230 for storing and managing protocol information for one or more protocols (e.g., custom or standard wireless protocols, such as ZigBee, Z-Wave, etc., and/or custom or standard wired protocols, such as Ethernet); and Mapping data 232 for storing and managing mapping data (e.g., mapping one or more transmission fields).

Each of the above-identified elements (e.g., modules stored in memory 206 of the transmitter 101) are optionally stored in one or more of the previously mentioned memory devices, and corresponds to a set of instructions for performing the function(s) described above. The above identified modules or programs (e.g., sets of instructions) need not be implemented as separate software programs, procedures, or modules, and thus various subsets of these modules are optionally combined or otherwise rearranged in various embodiments. In some embodiments, the memory 206, optionally, stores a subset of the modules and data structures identified above. Furthermore, the memory 206, optionally, stores additional modules and data structures not described above, such as a tracking module for tracking the movement and positioning of objects within a transmission field.

Figure 2B:
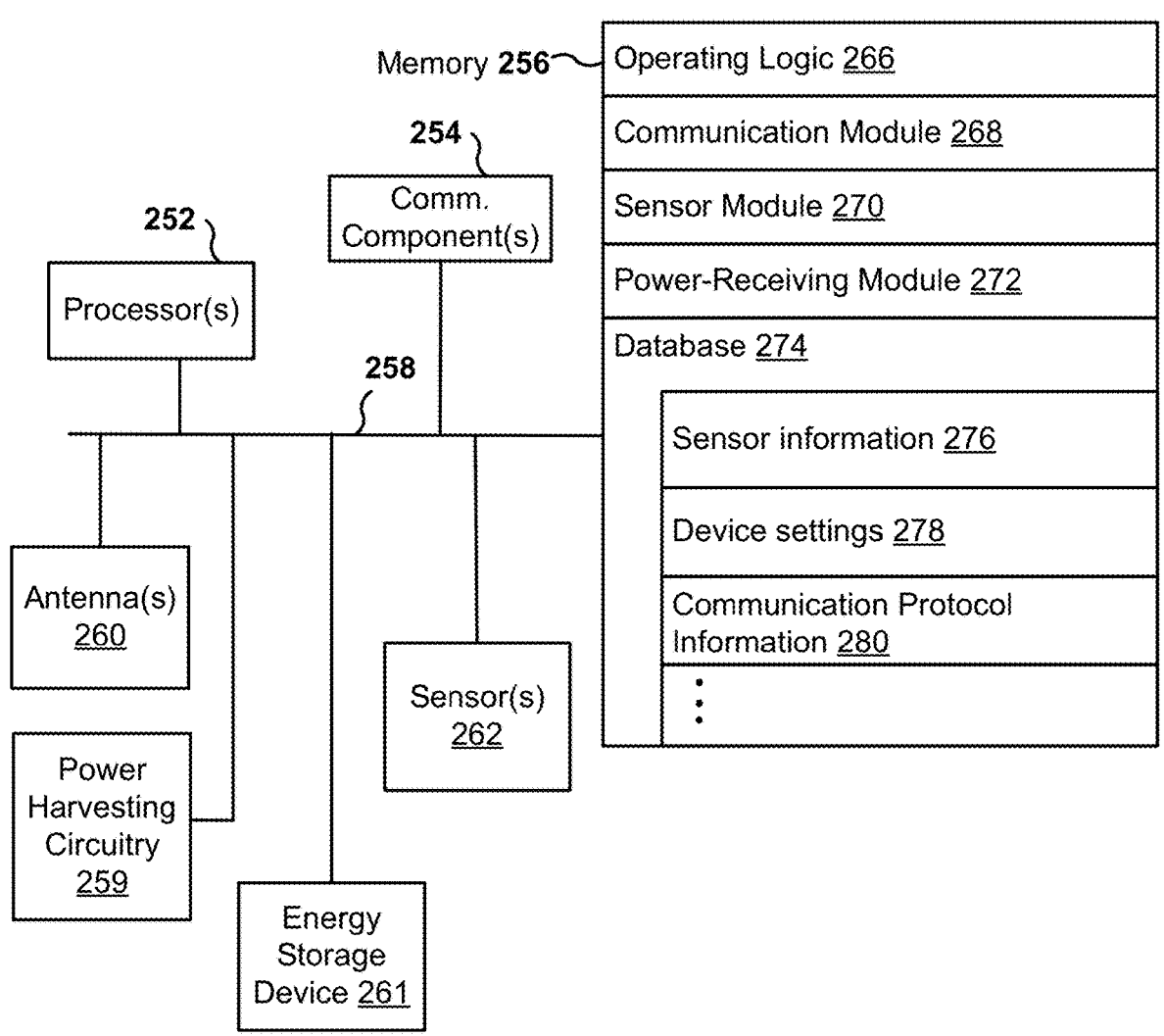
FIG. 2B is a block diagram illustrating a representative receiver device in accordance with some embodiments.

FIG. 2B is a block diagram illustrating a representative receiver device 103 (also sometimes called a receiver) in accordance with some embodiments. In some embodiments, the receiver device 103 includes one or more processing units (e.g., CPUs, ASICs, FPGAs, microprocessors, and the like) 252, one or more communication components 254, memory 256, antenna(s) 260, power harvesting circuitry 259, and one or more communication buses 258 for interconnecting these components (sometimes called a chipset). In some embodiments, the receiver device 103 includes one or more sensor(s) 262 such as one or sensors 113 described above with reference to FIG. 1. In some embodiments, the receiver device 103 includes an energy storage device 261 for storing energy harvested via the power harvesting circuitry 259. In various embodiments, the energy storage device 261 includes one or more batteries, one or more capacitors, one or more inductors, and the like.

In some embodiments, the power harvesting circuitry 259 includes one or more rectifying circuits and/or one or more power converters. In some embodiments, the power harvesting circuitry 259 includes one or more components (e.g., a power converter) configured to convert energy from power waves and/or energy pockets to electrical energy (e.g., electricity). In some embodiments, the power harvesting circuitry 259 is further configured to supply power to a coupled electronic device (e.g., an electronic device 121), such as a laptop or phone. In some embodiments, supplying power to a coupled electronic device include translating electrical energy from an AC form to a DC form (e.g., usable by the electronic device 121).

In some embodiments, the antenna(s) 260 include one or more surface-mounted dielectric resonator antenna(s), surface-mounted dielectric resonator antenna(s) with a hollowed core, and/or microstrip antenna(s).

In some embodiments, the receiver device 103 includes one or more output devices such as one or more indicator lights, a sound card, a speaker, a small display for displaying textual information and error codes, etc. In some embodiments, the receiver device 103 includes a location detection device, such as a GPS (global positioning satellite) or other geo-location receiver, for determining the location of the receiver device 103.

In various embodiments, the one or more sensor(s) 262 include one or more thermal radiation sensors, ambient temperature sensors, humidity sensors, IR sensors, occupancy sensors (e.g., RFID sensors), ambient light sensors, motion detectors, accelerometers, and/or gyroscopes.

The communication component(s) 254 enable communication between the receiver 103 and one or more communication networks. In some embodiments, the communication component(s) 254 are capable of data communications using any of a variety of custom or standard wireless protocols (e.g., IEEE 802.15.4, Wi-Fi, ZigBee, 6LoWPAN, Thread, Z-Wave, Bluetooth Smart, ISA100.11a, WirelessHART, MiWi, etc.) custom or standard wired protocols (e.g., Ethernet, HomePlug, etc.), and/or any other suitable communication protocol, including communication protocols not yet developed as of the filing date of this document.

The communication component(s) 254 include, for example, hardware capable of data communications using any of a variety of custom or standard wireless protocols (e.g., IEEE 802.15.4, Wi-Fi, ZigBee, 6LoWPAN, Thread, Z-Wave, Bluetooth Smart, ISA100.11a, WirelessHART, MiWi, etc.) and/or any of a variety of custom or standard wired protocols (e.g., Ethernet, HomePlug, etc.), or any other suitable communication protocol, including communication protocols not yet developed as of the filing date of this document.

The memory 256 includes high-speed random access memory, such as DRAM, SRAM, DDR SRAM, or other random access solid state memory devices; and, optionally, includes non-volatile memory, such as one or more magnetic disk storage devices, one or more optical disk storage devices, one or more flash memory devices, or one or more other non-volatile solid state storage devices. The memory 256, or alternatively the non-volatile memory within memory 256, includes a non-transitory computer-readable storage medium. In some embodiments, the memory 256, or the non-transitory computer-readable storage medium of the memory 256, stores the following programs, modules, and data structures, or a subset or superset thereof:

Operating logic 266 including procedures for handling various basic system services and for performing hardware dependent tasks;

Communication module 268 for coupling to and/or communicating with remote devices (e.g., remote sensors, transmitters, receivers, servers, mapping memories, etc.) in conjunction with communication component(s) 254;

Sensor module 270 for obtaining and processing sensor data (e.g., in conjunction with sensor(s) 262) to, for example, determine the presence, velocity, and/or positioning of the receiver 103, a transmitter 101, or an object in the vicinity of the receiver 103;

Wireless power-receiving module 272 for receiving (e.g., in conjunction with antenna(s) 260 and/or power harvesting circuitry 259) energy from power waves and/or energy pockets; optionally converting (e.g., in conjunction with power harvesting circuitry 259) the energy (e.g., to direct current); transferring the energy to a coupled electronic device (e.g., an electronic device 121); and optionally storing the energy (e.g., in conjunction with energy storage device 261); and Database 274, including but not limited to:
Sensor information 276 for storing and managing data received, detected, and/or transmitted by one or more sensors (e.g., sensors 262 and/or one or more remote sensors);

Device settings 278 for storing operational settings for the receiver 103, a coupled electronic device (e.g., an electronic device 121), and/or one or more remote devices; and Communication protocol information 280 for storing and managing protocol information for one or more protocols (e.g., custom or standard wireless protocols, such as ZigBee, Z-Wave, etc., and/or custom or standard wired protocols, such as Ethernet).

Each of the above identified elements (e.g., modules stored in memory 256 of the receiver 103) are optionally stored in one or more of the previously mentioned memory devices, and corresponds to a set of instructions for performing the function(s) described above. The above identified modules or programs (e.g., sets of instructions) need not be implemented as separate software programs, procedures, or modules, and thus various subsets of these modules are optionally combined or otherwise rearranged in various embodiments. In some embodiments, the memory 256, optionally, stores a subset of the modules and data structures identified above. Furthermore, the memory 256, optionally, stores additional modules and data structures not described above, such as an identifying module for identifying a device type of a connected device (e.g., a device type for an electronic device 121).

Representative Housing Structures

Figure 3:
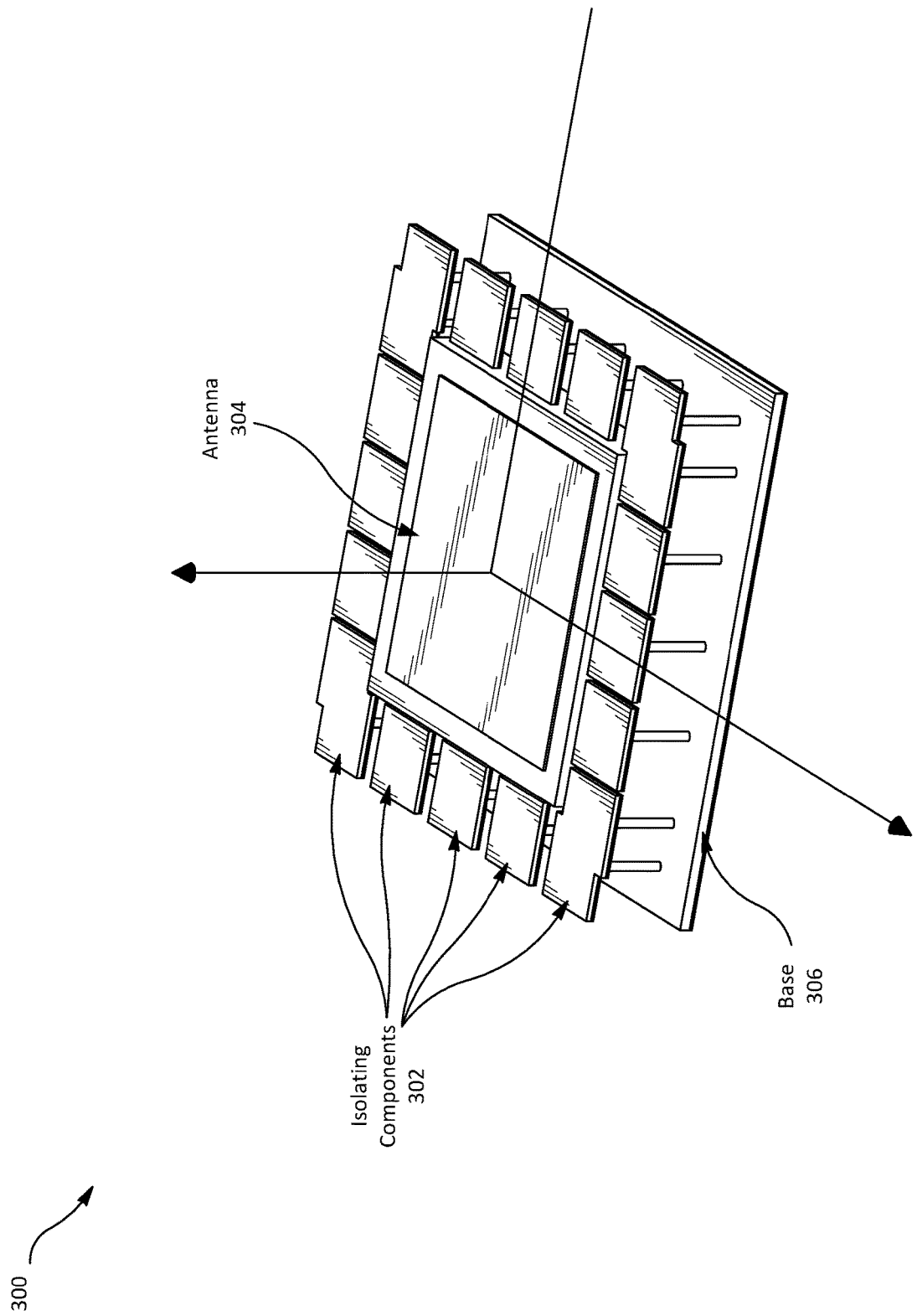
FIG. 3 illustrates a representative housing structure with distributed isolating components in accordance with some embodiments.

FIG. 3 illustrates a representative housing structure 300 (e.g., metallic structure) with isolating components (e.g., distributed metallic wires) in accordance with some embodiments. In accordance with some embodiments, the housing structure 300 includes isolating components 302, antenna 304, and base 306. In some embodiments, the base 306 comprises a conductive surface (e.g., a metallic surface). In various embodiments, the housing structure 300 utilizes pins, screws, wires, and/or conductive bars or cylinders as the isolating components 302 in order to increase isolation between antenna 304 and another antenna. In various embodiments, the isolating components 302 are comprised of a conductive material, such as carbon steel, stainless steel, brass, nickel alloy, and/or aluminum alloys. In some embodiments, the isolating components are arranged at set intervals around the antenna 304. In some embodiments, the isolating components are arranged at irregular intervals around the antenna 304. In some embodiments, the isolating components 302 are arranged so as to separate/isolate two or more antennas, but do not completely surround either antenna. In some embodiments, the isolating components 302 are arranged on the housing structure 300 so as to separate two or more antennas and reduce coupling between the antennas. In various embodiments, the antenna 304 comprises a surface mounted dielectric resonator antenna, a surface mounted dielectric resonator antenna with a hollowed core, and/or a microstrip antenna. In some embodiments, 900 megahertz may be used as a frequency for receiving or transmitting.

In some embodiments, the isolating components 302 are elevated from the base 306. In some embodiments, the height of individual isolating components (e.g., wires or bars) is optimized to reduce and/or alter antenna coupling. In some embodiments, the radius of antenna 304 is increased, or reduced, to modify the coupling between antennas. In some embodiments, the isolating components 302 are passive. In some embodiments, the isolating components 302 utilize a separate source of current than is used to provide power to the antenna 304. In some embodiments, the isolating components 302, the housing structure 300, and/or the base 306 are coupled to one or more ground planes. In some embodiments, the housing structure 300 includes one or more antennas which form an antenna array. In various embodiments, the antennas are arranged in a periodic or non-periodic pattern. For example, a housing structure 300 with a grid of 2×2, 16×16, 8×32, etc. of antennas optionally includes isolating components 302 for each section of the grid. In some embodiments, each section of the grid is referred to as a respective region of the housing structure. In some embodiments, some of the isolating components configured to isolate a first antenna are distinct from the isolating components configured to isolate a second antenna of the housing structure 300. In some embodiments, isolating components for each antenna are configured based on the respective antenna (e.g., the height of individual isolating components is based on a frequency used by the antenna), such that the housing structure 300 includes a first set of isolating components having first characteristics and a second set of isolating components having second characteristics distinct from the first characteristics.

In some embodiments, based on (1) a type of antenna(s) in an antenna array, (2) a size of the antenna(s), and/or (3) a frequency of operation for the antenna(s), certain characteristics of the antenna array are optimized accordingly. In some embodiments, the certain characteristics include one or more of: (a) a size of the isolating components in the antenna array, (b) a height of the isolating components, (c) a number of the isolating components, and (d) a gap between the antennas and a back reflector. As one, non-limiting example, the components (e.g., the isolating components) are smaller in antenna arrays that are configured to transmit at higher frequencies as compared to antenna arrays that are configured to transmit at lower frequencies (e.g., first components of a first antenna array configured to transmit at 2.4 GHz are smaller than second components of a second antenna array configured to transmit at 900 MHz). In some embodiments, respective antenna arrays (which may be transmitting at various respective frequencies) and their corresponding housing structures comprise a tightly coupled system and the entire system is optimized together to achieve an optimal configuration for transmitting at a particular frequency.

In some embodiments, the antenna(s) 304 have non-rectangular shapes, such as circles, polygons, or irregular shapes. In some embodiments, the isolating components 302 surround the antennas by conforming to each antenna's respective shape. In some embodiments where the antennas are rectangular, the isolating components 302 surround the antennas on four sides. In some embodiments where the antennas are circular, the antennas are surrounded in the shape of a circle formed by the isolating components 302. In some embodiments, the isolating components 302 have a uniform size and/or shape, while in other embodiments, the isolating components 302 have multiple sizes and/or shapes. In some embodiments, the isolating components 302 are made of a uniform substance (e.g., brass), while in other embodiments, the isolating components 302 are made of multiple substances (e.g., brass and steel). In some embodiments, the isolating components 302 have an irregular shape. For example, the isolating components 302 have a larger surface further away from the base 306.

In some embodiments, the base 306 is coupled to (e.g., attached to) ground. In some embodiments, the base 306 is coupled to a circuit that includes a separate electric current, different from the antennas. In some embodiments, transmission wires are run through or above the base 306 and attached to the antenna(s) 304. In some embodiments, the antenna 304 is used for wireless power receiving and/or transmitting in accordance with the embodiments described above with respect to FIG. 1.

Figure 4A:
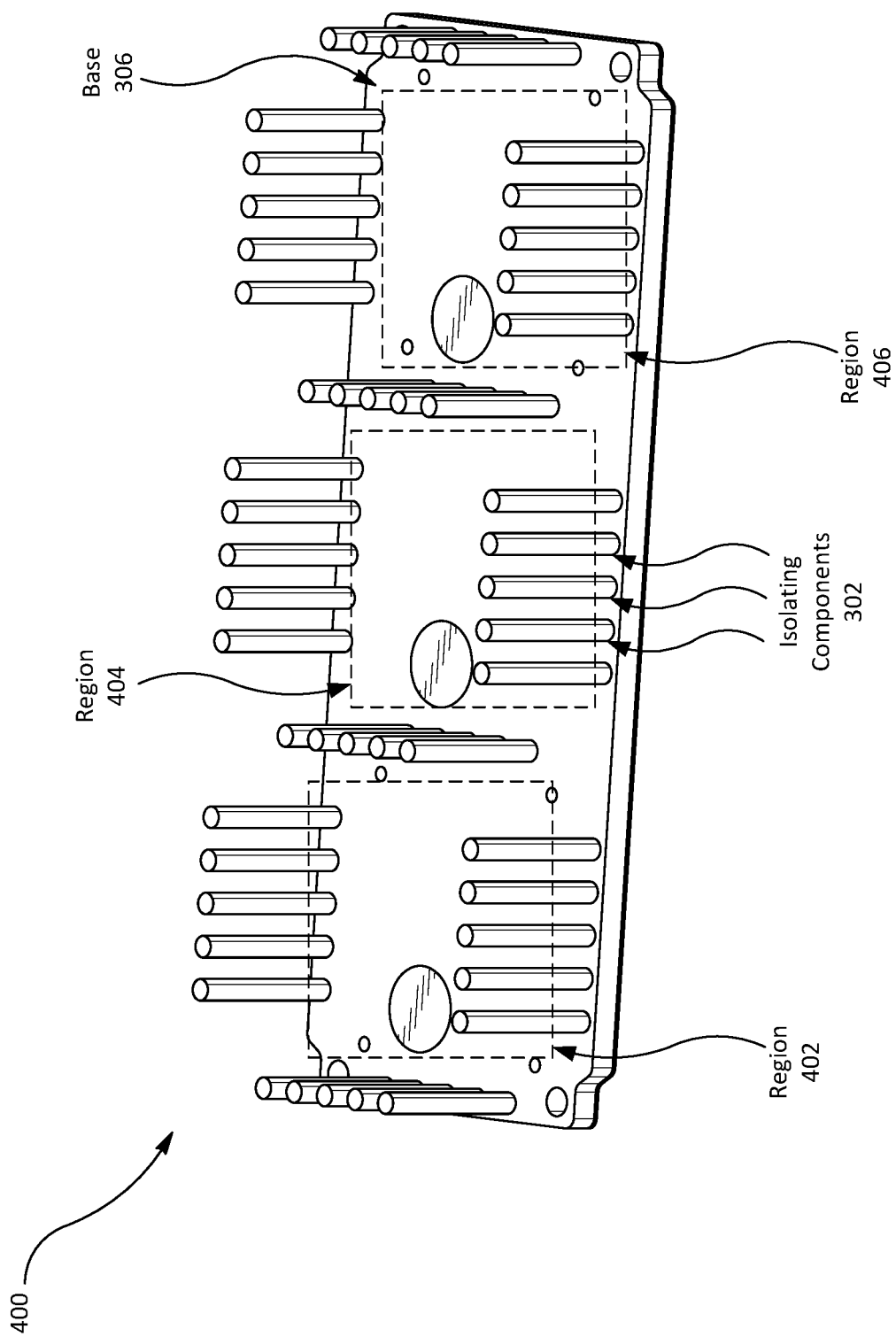
FIGS. 4A-4B illustrate another representative housing structure with distributed isolating components in accordance with some embodiments.
Figure 4B:
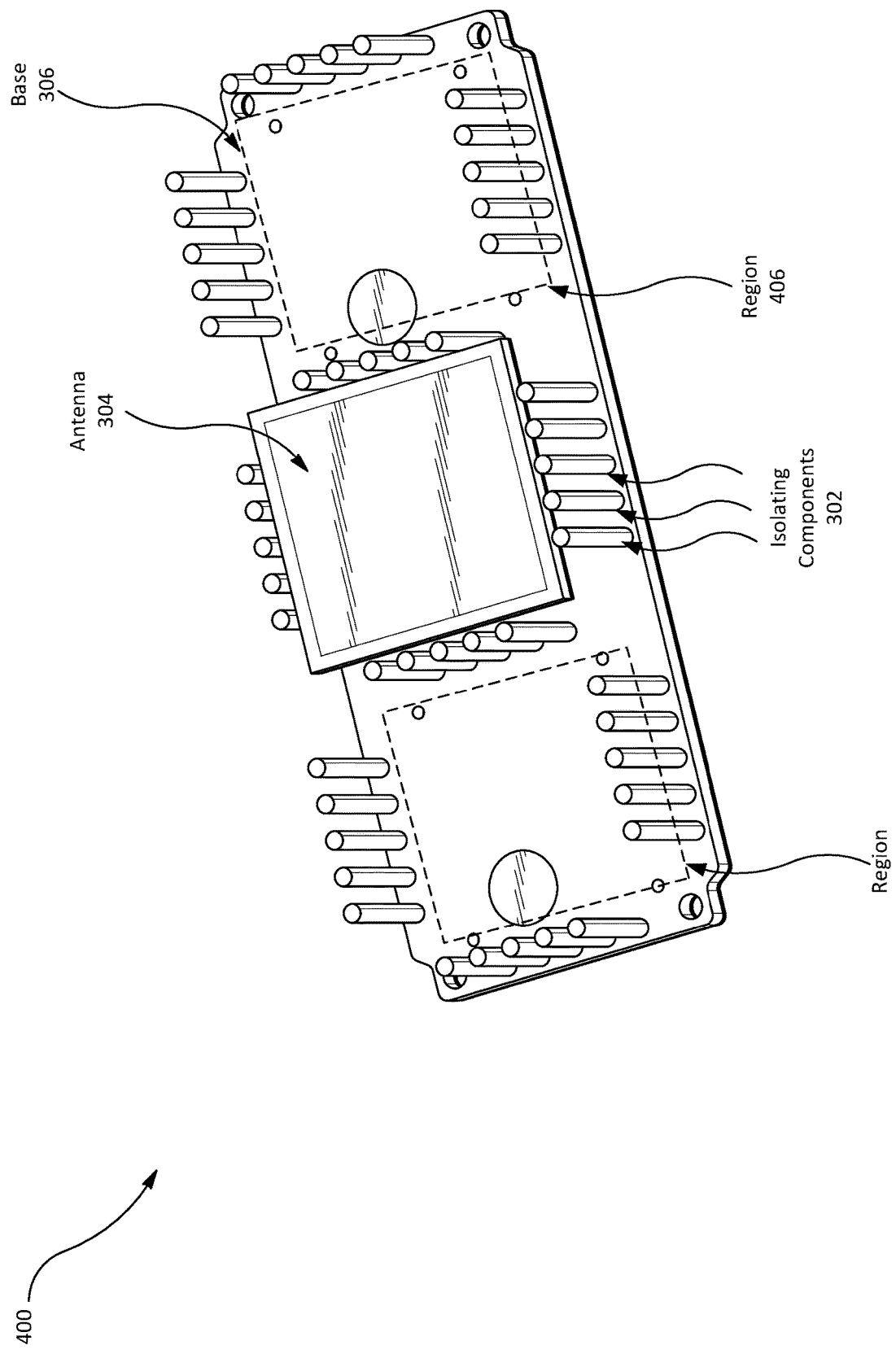

FIGS. 4A-4B illustrate a representative housing structure 400 with distributed isolating components 302 in accordance with some embodiments. In FIG. 4A, the housing structure 300 comprises a metallic structure with isolating components 302 (e.g., periodic metallic wires) and a base 306. FIG. 4A also shows regions 402, 404, and 406 defined by the isolating components 302. In accordance with some embodiments, the regions 402, 404, and 406 are physically separated by respective subsets of the isolating components 302 so as to reduce mutual coupling between antennas mounted in the regions 402, 404, and 406.

In some embodiments, the housing structure 300 uses pins, screws or metal bars/cylinders as isolating components to increase isolation between one antenna and another antenna (e.g., another antenna on the housing structure 300). In various embodiments, the isolating components 302 are comprised of any medium, such as carbon steel wire, stainless steel, brass, nickel alloy and/or aluminum alloys. In some embodiments, the isolating components 302 are arranged/configured to separate two or more antennas in order to reduce coupling between the antennas. In some embodiments, respective sets of isolating components 302 separate each respective antenna, such that a first antenna is placed within a first set of isolating components (i.e., each isolating component in this first set surrounds a perimeter of the first antenna) and a second antenna is placed within a second set of isolating components (i.e., each isolating component in the second set surrounds a perimeter of the second antenna).

In some embodiments, the isolating components 302 are elevated from the base 306. In some embodiments, the height of wires or bars composing the isolating components 302 are optimized to reduce and/or alter coupling effects between respective antennas. In some embodiments, the housing structure 300 includes several antennas (e.g., 3 antennas) separated by the isolating components 302. In various embodiments, the antennas are arranged in a periodic or non-periodic pattern. For example, a housing structure 300 with a grid of 2×2, 16×16, 8×32, etc. for antennas optionally includes isolating components 302 outlining each section of the grid. In some embodiments, the isolating components 302 are configured to surround or outline respective perimeters of respective antennas that have multiple distinct shapes (e.g., distinct geometric and/or irregular shapes).

In FIG. 4B, the housing structure 400 includes isolating components 302, antenna(s) 304, and a base 306. In some embodiments, the housing structure 400 uses pins, screws or metal bars/cylinders as isolating components to increase isolation between one antenna and another antenna (e.g., another antenna on the housing structure 400). In various embodiments, the isolating components 302 are comprised of any medium, such as carbon steel wire, stainless steel, brass, nickel alloy and/or aluminum alloys. In some embodiments, the isolating components 302 are arranged/configured to separate two or more antennas in order to reduce coupling between the antennas.

As shown in FIG. 4B, the antenna 304 is placed in region 404 (shown in FIG. 4A) within a first set of isolating components 302, such that a perimeter of the antenna 304 is surrounded by the first set of isolating components. FIG. 4B also shows that two other regions 402 and 406 of the housing structure 400 are available to receive additional antennas and these two other regions 402 and 406 are defined by respective sets of isolating components, so that after respective antennas are placed within the two other regions, the sets of isolating components create gaps between all antennas that are included within the housing structure 400. In this way, mutual coupling effects between the antennas are reduced are wireless power transmission efficiencies and performance are improved as a higher percentage energy associated with transmitted power waves is sent into a transmission field of the transmitter instead of being wasted due to mutual coupling effects.

Representative Processes

Figure 5B:
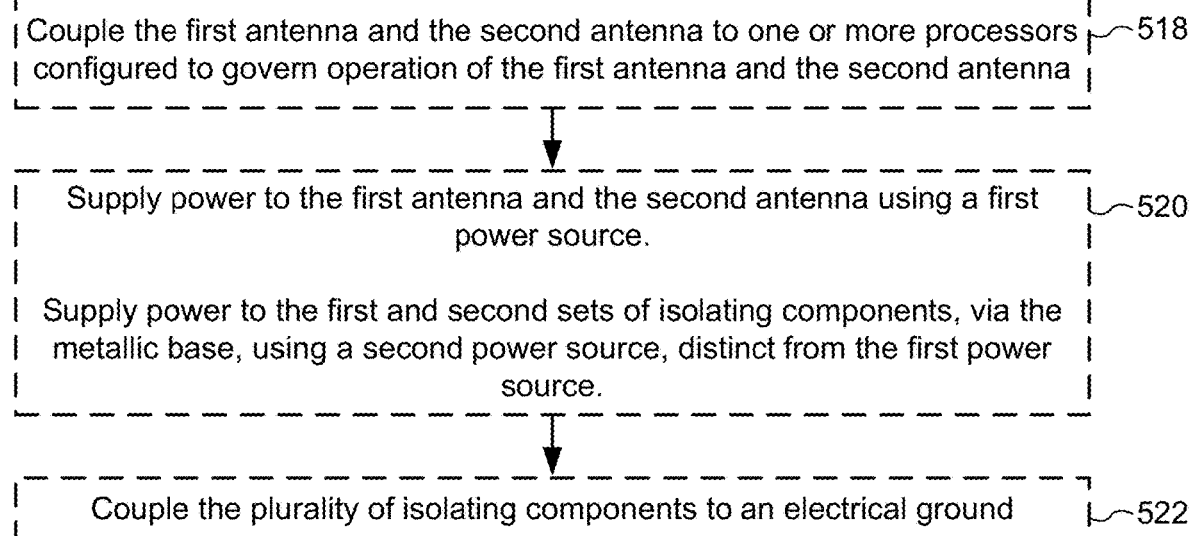

Attention is now directed to the flowchart representations of FIGS. 5A-5B. FIGS. 5A-5B are flowcharts illustrating a method 500 of constructing a transmitter in accordance with some embodiments.

At least two antennas (e.g., antenna(s) 210, FIG. 2A) are provided (502), the at least two antennas configured to direct electromagnetic waves toward a wireless power receiver such that the electromagnetic waves interfere constructively at a location proximate to the wireless power receiver. In some embodiments, the at least two antennas include one or more of: a surface-mounted dielectric resonator antenna; a surface-mounted dielectric resonator antenna with a hollowed core; and a microstrip antenna.

A housing structure (e.g., housing structure 400, FIG. 4A) is provided (504), the housing structure configured to receive the at least two antennas. In some embodiments, the housing structure comprises a metallic structure.

The housing structure includes (506): (1) a metallic base; (2) a first set of isolating components extending upwardly relative to the metallic base and defining a first region of the housing structure that is configured to receive a first antenna of the at least two antennas; and (3) a second set of isolating components extending upwardly relative to the metallic base and defining a second region of the housing structure that is configured to receive a second antenna of the at least two antennas, the second set including at least some isolating components distinct from those in the first set. For example, FIG. 4B shows a housing structure 400 with a metallic base 306, a subset of isolating components 302 surrounding the antenna 304, and a subset of the isolating components 302 defining the region 402 to the left of the antenna 304.

The first and second sets of isolating components are configured (508) to (i) create a physical gap in the housing structure between the first and second antennas and (ii) reduce a mutual coupling between the first antenna and the second antenna. FIG. 4A shows the isolating components 302 separating regions 402, 404, and 406, thereby creating a physical gap and reducing mutual coupling in accordance with some embodiments.

The first antenna is mounted (510) at the first region of the housing structure. For example FIG. 4B shows the antenna 304 mounted in the region 404 (shown in FIG. 4A).

A first perimeter of the first antenna is surrounded (512) by the first set of isolating components. For example, FIG. 4B shows a perimeter of antenna 304 surrounded by a subset of isolating components 302.

The second antenna is mounted (514) at the second region of the housing structure. For example, in accordance with some embodiments, a second antenna is mounted in region 402 or 406 shown in FIG. 4B.

A second perimeter of the second antenna is surrounded (516) by the second set of isolating components.

In some embodiments, the first antenna and the second antenna (e.g., antenna(s) 210 in FIG. 2A) are coupled (518) to one or more processors configured to govern operation of the first antenna and the second antenna. For example, antenna(s) 210 in FIG. 2A are coupled to processor(s) 202 via communications bus 208.

In some embodiments, power is supplied (520) to the first antenna and the second antenna using a first power source; and power is supplied to the first and second sets of isolating components, via the metallic base, using a second power source, distinct from the first power source.

In some embodiments, the plurality of isolating components (e.g., isolating components 302, FIG. 4A) is coupled (522) to an electrical ground. For example, the metallic base is grounded thereby grounding the isolating components.

Although some of various drawings illustrate a number of logical stages in a particular order, stages that are not order dependent may be reordered and other stages may be combined or broken out. While some reordering or other groupings are specifically mentioned, others will be obvious to those of ordinary skill in the art, so the ordering and groupings presented herein are not an exhaustive list of alternatives. Moreover, it should be recognized that the stages could be implemented in hardware, firmware, software or any combination thereof.

Features of the present disclosure can be implemented in, using, or with the assistance of a computer program product, such as a storage medium (media) or computer-readable storage medium (media) having instructions stored thereon/ in which can be used to program a processing system to perform any of the features presented herein. The storage medium (e.g., memory 106) can include, but is not limited to, high-speed random access memory, such as DRAM, SRAM, DDR RAM or other random access solid state memory devices, and may include non-volatile memory, such as one or more magnetic disk storage devices, optical disk storage devices, flash memory devices, or other non-volatile solid state storage devices. Memory 106 optionally includes one or more storage devices remotely located from the CPU(s) 104. Memory 106, or alternatively the non-volatile memory device(s) within memory 106, comprises a non-transitory computer readable storage medium.

Stored on any one of the machine readable medium (media), features of the present invention can be incorporated in software and/or firmware for controlling the hardware of a processing system, and for enabling a processing system to interact with other mechanism utilizing the results of the present invention. Such software or firmware may include, but is not limited to, application code, device drivers, operating systems, and execution environments/ containers.

Communication systems as referred to herein (e.g., communications component 112, receiver 120) optionally communicate via wired and/or wireless communication connections. Communication systems optionally communicate with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. Wireless communication connections optionally use any of a plurality of communications standards, protocols and technologies, including but not limited to radio-frequency (RF), radio-frequency identification (RFID), infrared, radar, sound, Global System for Mobile Communications (GSM), Enhanced Data GSM Environment (EDGE), high-speed downlink packet access (HSDPA), high-speed uplink packet access (HSUPA), Evolution, Data-Only (EV-DO), HSPA, HSPA+, Dual-Cell HSPA (DC-HSPDA), long term evolution (LTE), near field communication (NFC), ZigBee, wideband code division multiple access (W-CDMA), code division multiple access (CDMA), time division multiple access (TDMA), Bluetooth, Wireless Fidelity (Wi-Fi) (e.g., IEEE 102.11a, IEEE 102.11ac, IEEE 102.11ax, IEEE 102.11b, IEEE 102.11g and/or IEEE 102.11n), voice over Internet Protocol (VoIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

It will also be understood that, although the terms first, second, etc. are, in some instances, used herein to describe various elements, these elements should not be limited by these terms. These terms are only used to distinguish one element from another. For example, a first antenna could be termed a second antenna, and, similarly, a second antenna could be termed a first antenna, without departing from the scope of the various described embodiments.

The terminology used in the description of the various described embodiments herein is for the purpose of describing particular embodiments only and is not intended to be limiting. As used in the description of the various described embodiments and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting" or "in accordance with a determination that," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]" or "in accordance with a determination that [a stated condition or event] is detected," depending on the context.

The foregoing description, for purpose of explanation, has been described with reference to specific embodiments. However, the illustrative discussions above are not intended to be exhaustive or to limit the scope of the claims to the precise forms disclosed. Many modifications and variations are possible in view of the above teachings. The embodiments were chosen in order to best explain the principles underlying the claims and their practical applications, to thereby enable others skilled in the art to best use the embodiments with various modifications as are suited to the particular uses contemplated.

What is claimed is:

1. A transmitter device for a wireless charging system, comprising:
    at least two antennas configured to direct electromagnetic waves toward a wireless power receiver such that the electromagnetic waves interfere constructively at a location proximate to the wireless power receiver; and
    a housing structure configured to receive the at least two antennas, the housing structure including:
        a metallic base;
        a first set of isolating components extending upwardly relative to the metallic base and defining a first region of the housing structure that is configured to receive a first antenna of the at least two antennas; and
        a second set of isolating components extending upwardly relative to the metallic base and defining a second region of the housing structure that is configured to receive a second antenna of the at least two antennas, the second set including at least some isolating components distinct from those in the first set;
    wherein the first and second sets of isolating components are configured (i) to create a physical gap in the housing structure between the first and second antennas, and (ii) to reduce a mutual coupling between the first antenna and the second antenna, and
    wherein the first and second sets of isolating components comprise respective pluralities of metallic cylinders.

2. The transmitter device of claim 1, further comprising:
    a first power source configured to provide power to the at least two antennas; and
    a second power source configured to provide power to the first and second sets of isolating components, wherein the first power source is distinct from the second power source.

3. The transmitter device of claim 2, further comprising respective transmission lines for coupling the at least two antennas to the first power source.

4. The transmitter device of claim 2, wherein the metallic base is configured to provide power from the second power source to the first and second sets of isolating components.

5. The transmitter device of claim 1, wherein the first set of isolating components has at least one structural characteristic that is configured in accordance with a first characteristic of the first antenna.

6. The transmitter device of claim 5, wherein the second set of isolating components has at least one structural characteristic that is configured in accordance with a second characteristic of the second antenna.

7. The transmitter device of claim 6, wherein the first and second characteristics correspond to respective geometric shapes of the first and second antennas.

8. The transmitter device of claim 6, wherein the first and second characteristics correspond to respective frequencies at which the first and second antennas transmit the electromagnetic waves.

9. The transmitter device of claim 6, wherein the at least one structural characteristic of the first set of isolating components is distinct from the at least one structural characteristic of the second set of isolating components.

10. The transmitter device of claim 1, wherein:
the first antenna is configured to direct the electromagnetic waves outward from a particular surface of the first antenna, and
the first set of isolating components extends upwardly above the particular surface of the first antenna.

11. The transmitter device of claim 1, further comprising one or more processors that are (i) in communication with the at least two antennas and (ii) configured to control transmission of the electromagnetic waves using the at least two antennas.

12. The transmitter device of claim 1, further comprising an additional antenna configured for wireless communications with the wireless power receiver.

13. The transmitter device of claim 1, wherein the at least two antennas includes one or more of:
a surface-mounted dielectric resonator antenna;
a surface-mounted dielectric resonator antenna with a hollowed core; and
a microstrip antenna.

14. The transmitter device of claim 1, wherein:
the first region and the second region of the housing structure are respective coupling locations that are configured to couple the first antenna and the second antenna, respectively, to the metallic base,
the first set of isolating components is configured to surround a first perimeter of the first antenna, and
the second set of isolating components is configured to surround a second perimeter of the second antenna.

15. The transmitter device of claim 1, wherein the wireless power receiver includes an energy harvesting component configured to obtain energy from the electronic magnetic waves and convert the obtained energy to electrical charge used to provide power to an electronic device associated with the wireless power receiver.

16. A method of constructing a transmitter device for a wireless charging system, comprising:
providing at least two antennas configured to direct electromagnetic waves toward a wireless power receiver such that the electromagnetic waves interfere constructively at a location proximate to the wireless power receiver;
providing a housing structure configured to receive the at least two antennas, the housing structure including:
a metallic base;
a first set of isolating components extending upwardly relative to the metallic base and defining a first region of the housing structure that is configured to receive a first antenna of the at least two antennas; and
a second set of isolating components extending upwardly relative to the metallic base and defining a second region of the housing structure that is configured to receive a second antenna of the at least two antennas, the second set including at least some isolating components distinct from those in the first set;
wherein the first and second sets of isolating components are configured (i) to create a physical gap in the housing structure between the first and second antennas and (ii) to reduce a mutual coupling between the first antenna and the second antenna;
wherein the first and second sets of isolating components comprise respective pluralities of metallic cylinders;
mounting the first antenna at the first region of the housing structure, wherein a first perimeter of the first antenna is surrounded by the first set of isolating components; and
mounting the second antenna at the second region of the housing structure, wherein a second perimeter of the second antenna is surrounded by the second set of isolating components.

17. The method of claim 16, further comprising communicatively coupling the first antenna and the second antenna to one or more processors, the one or more processors configured to govern operation of the first antenna and the second antenna.

18. The method of claim 16, further comprising:
supplying power to the first antenna and the second antenna using a first power source; and
supplying power to the first and second sets of isolating components, via the metallic base, using a second power source, distinct from the first power source.

19. The method of claim 16, further comprising coupling the plurality of isolating components to an electrical ground.

* * * * *